US00RE41372E

(19) United States
(12) Reissued Patent
Okada et al.

(10) Patent Number: US RE41,372 E
(45) Date of Reissued Patent: Jun. 8, 2010

(54) OPTICAL DISC APPARATUS

(75) Inventors: Yuu Okada, Moriguchi (JP); Kenji Fujiune, Takatsuki (JP); Katsuya Watanabe, Nara (JP); Takeharu Yamamoto, Takatuki (JP); Jun Kikuchi, Takatsuki (JP)

(73) Assignee: Panasonic Corporation, Osaka (JP)

(21) Appl. No.: 10/750,527

(22) Filed: Dec. 31, 2003

Related U.S. Patent Documents

Reissue of:
(64) Patent No.: 6,400,663
Issued: Jun. 4, 2002
Appl. No.: 09/660,766
Filed: Sep. 13, 2000

(30) Foreign Application Priority Data

Sep. 13, 1999 (JP) ..... 11-258578

(51) Int. Cl.
*G11B 7/00* (2006.01)

(52) U.S. Cl. ..... 369/44.29; 369/53.28
(58) Field of Classification Search ..... 369/44.23, 369/44.25, 44.26, 44.27, 44.29, 44.32, 44.35, 369/47.55, 53.14, 53.19, 53.23, 53.28, 53.37
See application file for complete search history.

(56) References Cited

U.S. PATENT DOCUMENTS 4,890,273 A * 12/1989 Takeuchi et al. ..... 369/44.36
5,511,050 A * 4/1996 Matsumoto et al. ..... 369/44.23
6,087,644 A * 7/2000 Schell ..... 250/201.5

FOREIGN PATENT DOCUMENTS

JP 5-12683 1/1993

OTHER PUBLICATIONS

Japan office action dated Sep. 1, 2003, no english translation provided.

* cited by examiner

*Primary Examiner*—Paul Huber
(74) *Attorney, Agent, or Firm*—Snell & Wilmer L.L.P.

(57) ABSTRACT

An optical disc apparatus includes: a converging section for converging a light beam and irradiating a rotating information medium with the converged light beam; a moving section for moving the converging section, thereby moving a converging point of the converged light beam in a direction perpendicular to an information surface of the information medium; a converging state detection section for generating a focus servo signal which represents a converging state of the light beam on the information medium based on reflected light or transmitted light of the light beam from the information medium; a focus servo control section for controlling the moving section based on the focus servo signal, so that the light beam reaches a predetermined converging state on the information medium; and a focus pull-in section for turning ON the control by the focus servo control section, wherein the focus pull-in section turns ON the control by the focus servo control section in a case where the focus pull-in section determines that the converging point of the light beam is located in the vicinity of the minimum velocity position on the information medium axial deviation.

44 Claims, 20 Drawing Sheets

OPTICAL DISC APPARATUS

Matter enclosed in heavy brackets [ ] appears in the original patent but forms no part of this reissue specification; matter printed in italics indicates the additions made by reissue.

*This application is a Reissue of U.S. application Ser. No. 09/660,766 (filed Sep. 13, 2000) which issued as U.S. Pat. No. 6,400,663 (issued Jun. 4, 2002).*

BACKGROUND OF THE INVENTION

1. Field of the Invention

The present invention relates to an optical disk apparatus for optically reproducing/recording a signal from/to an information medium (e.g., an optical disc) using a light beam from a light source such as a semiconductor laser. More particularly, the present invention relates to an optical disc apparatus which performs a focus servo.

2. Description of the Related Art

In order to optically reproduce/record information from/to an information medium using a light beam from a light source such as a laser, it is necessary to perform a focus servo so that the focal point (converging point) of the laser beam always stays on the information surface of the information medium. In order to achieve this, an operation called a focus pull-in is performed. That is to move an object lens, prior to the focus servo, so that the focal point of the laser beam is brought to the information surface of the information medium.

According to a conventional method such as described in Japanese Laid-open Publication No. 62-33340, if the focus pull-in fails, the rotation and the phase of the disc is shifted and the focus pull-in is attempted again. FIG. 20 shows an optical disc apparatus performing the focus servo by a focus pull-in in such a manner.

The optical disc apparatus in FIG. 20 includes an optical system for irradiating a light beam on a disc 101 (i.e., an information medium) and forming a light beam spot 111 thereon. The optical system includes a light source 103, e.g., a semiconductor laser, for generating a light beam 110 and a converging lens 107. The optical disc apparatus further includes a disc motor 102 for rotating the disc at a predetermined number of revolutions. The light beam 110 emitted from the light source 103 is converged by the converging lens 107, whereby the light beam spot 111 is formed on the information surface of the disc 101. A focus actuator moves the converging lens 107 in a direction perpendicular to the disc surface, thereby changing the position of the focal point of the light beam. The reflecting light from the light beam spot 111 on the disc 101 passes through the converging lens 107 and then enters a 4-region photodetector 109.

The 4-region photodetector 109 is divided into four regions A to D. The signals detected by the diagonally positioned regions are added together by an adder 121, whereby summation signals are created. Specifically, the signals detected by the regions A and D are added to create a summation signal A+D, and the signals detected by the regions B and C are added to create a summation signal B+C. The summation signal B+C is then subtracted from the summation signal A+D, whereby a differential signal is created. A focus error signal FE is created from the differential signal by using an astigmatic method in which the differential signal is smoothed by a low pass filter (LPF) 123. The focus error signal FE is input to a digital signal processor (DSP) 125, and then through filter calculation such as adding, multiplying, shift processing by a focus servo control section 125a, a drive signal FOD is created and output from the DSP 125. The current of the drive signal FOD is amplified by a focus driving circuit 126, thereby driving a focus actuator 127. Accordingly, the focus servo is achieved.

During a reproducing/recording of the information, the optical disc not only rotates but also moves up and down in a direction perpendicular to the information surface of the disc, i.e., axial deviation occurs. Referring to FIG. 21, the problem of the focus pull-in will now be described in the case where the axial deviation is significant. FIG. 21 shows the relationship between the focal point of the light beam and the position of the information surface on the disc.

As shown in FIG. 21, in the case where the relative speed of the information surface of the disc to the focal point is great due to the axial deviation during a high-speed rotation of the disc, the focus servo can not follow the axially deviating motion of the disc and therefore the focus pull-in fails. As a result, the focus servo is not achieved. In order to solve this problem, in the conventional example shown in FIG. 20, the rotation phase of the disc is detected using a rotation phase detector 112 and the focus pull-in section 125b in the DSP 125 repeatedly conducts the focus pull-in attempt by changing the movement of the focal point of the converging lens, as shown by a through d in FIG. 21. Based on the detected rotation phase of the disc, the focus pull-in is repeated. When the rotation phase of the lens comes to the point where the relative speed of the information surface of the disc to the focal point becomes minimum, the focus servo is achieved.

When a disc is rotated for high-speed reproduction, the acceleration of eccentricity and the acceleration of axial deviation of the optical disk increase in proportion to the square of the rotation speed of the disc. In order to follow this acceleration of the axial deviation, the gain crossover point of the servo system and the thrust of the actuator are increased according to the conventional method. However, a significant axial deviation of the disc reduces the range of the disc rotation phase in which the speed of the axial deviation is at or below the level at which a successful focus pull-in is possible. Therefore, it is possible to change the focus point of the light beam by small steps. This reduces the possibility of obtaining the rotation phase in which a successful focus pull-in is possible. As a result, the number of focus pull-in attempts increases and thus it takes longer before a successful focus pull-in.

SUMMARY OF THE INVENTION

According to one aspect of this invention, there is provided an optical disc apparatus including: a converging section for converging a light beam and irradiating a rotating information medium with the converged light beam; a moving section for moving the converging section, thereby moving a converging point of the converged light beam in a direction perpendicular to an information surface of the information medium; a converging state detection section for generating a focus servo signal which represents a converging state of the light beam on the information medium based on reflected light or transmitted light of the light beam from the information medium; a focus servo control section for controlling the moving section based on the focus servo signal, so that the light beam reaches a predetermined converging state on the information medium; and a focus pull-in section for turning ON the control by the focus servo control section, wherein the focus pull-in section turns ON the control by the focus servo control section in a case where the focus pull-in section determines that the converging point of the light beam is located in the vicinity of the minimum velocity position on the information medium axial deviation.

In one embodiment of the invention, the optical disc apparatus further includes an S-shape signal detection section for detection S-shape signals which appear in the focus servo signal when the converging point of the light beam contacts the information surface of the information medium, wherein the focus pull-in section determines whether or not the converging point of the light beam is located in the vicinity of the minimum velocity position on the information medium axial deviation.

In another embodiment of the invention, the optical disc apparatus further includes a detected interval measuring section for measuring an interval between temporally adjoining two of the S-shape signals, wherein the focus pull-in section determines that the converging point of the light beam is located in the vicinity of the minimum velocity position on the information medium axial deviation when the interval exceeds a predetermined first period of time.

In still another embodiment of the invention, the S-shape signal detection section detects the S-shape signals by either moving the converging point of the light beam toward or away from the information surface of the information medium, or making the converging point of the light beam wait at a predetermined position.

In still another embodiment of the invention, the S-shape signal detection section detects the S-shape signals by retrying to move the converging point of the light beam toward the information surface of the information medium at a predetermined speed, in the case where the interval is not output from the detected interval measuring section after the elapse of time required for one revolution of the information medium.

In still another embodiment of the invention, a retry speed of the converging point of the light beam is set so as to be smaller than a speed of the previous toward or away from the information surface of the information medium.

In still another embodiment of the invention, the S-shape signals are detected by making the converging point of the light beam wait at a predetermined position in the case where the interval is not output from the detected interval measuring section after the elapse of the first period.

In still another embodiment of the invention, the optical disc apparatus further includes a time width measuring section for measuring a time width of a predetermined portion of an S-signal, wherein the focus pull-in section determines that the converging point of the light beam is located in the vicinity of the minimum velocity position on the information medium axial deviation when the interval exceeds a predetermined second period of time.

In still another embodiment of the invention, the S-shape signal detection section detects the S-shape signal by either moving the converging point of the light beam toward or away from the information surface of the information medium, or making the converging point in the light beam wait at an predetermined position.

In still another embodiment of the invention, the S-shape signal detection section detects the S-shape signals by retrying to move the converging point of the light beam toward the information surface of the invention medium at a predetermined speed, in the case where the interval is not output from the detected interval measuring section after the elapse of time required for one revolution of the information medium.

In still another embodiment of the invention, a retry speed of the converging point of the light beam is set so as to be smaller than a speed of the previous motion toward or away from the information surface of the information medium.

In still another embodiment of the invention, the S-shape signal detection section detects the S-shape signals by making the converging point of the light beam wait at a predetermined position in the case where the interval is not output from the detected interval measuring section after the elapse of the time required for one revolution of the information medium after the time when one of the S-signals was detected, or the elapse of the first period which is slightly shorter than the time required for one revolution of the information medium.

In still another embodiment of the invention, the focus pull-in section turns ON the control by the focus servo control section when it is detected that the level of the focus servo control section reaches a predetermined pull-in level.

In still another embodiment of the invention, the focus pull-in section further includes a moving speed switching section for switching the moving speed of the converging point of the light beam in response to the polarity of the S-signals when the focus pull-in section moves the converging point of the light beam toward or away from the information surface of the information medium.

In still another embodiment of the invention, the focus pull-in section further includes a moving speed switching section for switching the moving speed of the converging point of the light beam in response to the polarity of the S-signals when the focus pull-in section moves the converging point of the light beam toward or away from the information surface of the information medium.

In still another embodiment of the invention, the optical disc apparatus further includes a rotation speed measurement section for measuring the rotation speed of the information medium wherein the focus pull-in section sets the first period of time or the predetermined speed based on the rotation speed measured by the rotation speed measurement section.

In still another embodiment of the invention, the optical disc apparatus further includes a rotation speed measurement section for measuring the rotation speed of the information medium wherein the focus pull-in section sets the second period of time or the predetermined speed based on the rotation speed measured by the rotation speed measurement section.

In still another embodiment of the invention, the optical disc apparatus further includes a information medium identification section for identifying the type of the information medium by a signal based on reflecting light or transmitting light from the information medium, wherein the focus pull-in section determines a moving speed or a waiting position of the converging point of the light beam when the focus pull-in section moves the converging point of the light beam toward or away from the information surface of the information medium, or makes the converging point of the light beam wait at a predetermined position.

In still another embodiment of the invention, the conversion point of the light beam, moving toward the information surface of the information medium, is kept at a predetermined driving value based on the detection result of the type of the information, whereby the conversion point of the light beam is kept from approaching unnecessarily close to the information medium.

In still another embodiment of the invention, the optical disc apparatus includes a lower limit detection section for detecting the lower limit of an output signal of the focus servo control section or an input signal thereof during the operation of the focus servo control section, and a lower limit storing section for storing the detected lower limit, wherein, in the case where the focus servo control section is restarted after the focus servo control section is OFF: it is determined that the converging point of the light beam is in the vicinity of the minimum velocity position on the information medium axial deviation position when the conversing point of the light beam contacts on the information surface of the information medium until the output signal or the drive signal reaches the lower limit by driving the moving section; and the focus pull-in section performs a retry operation which restarts the control by the focus servo control section when it is determined that the level of the focus servo signal reaches a predetermined pull-in level.

In still another embodiment of the invention, the lower limit storing section stores move then one lower limit which corresponds to more than one location located in the radius direction of the information medium, and the optical disc apparatus further includes a calculation section for calculating the lower limit corresponding a predetermined location in a radius direction of the information medium based on the at least one lower limit.

In still another embodiment of the invention, the lower limit detection section operates during the operation of the focus servo control section, whereby the stored value of the lower limit storing section is continuously updated.

Thus, the invention described herein makes possible the advantages of providing an optical disc apparatus capable of performing a quick and stable focus servo even in the case where the optical disc rotates at a high speed and the axial deviation is significant.

These and other advantages of the present invention will become apparent to those skilled in the art upon reading and understanding the following detailed description with reference to the accompanying figures.

DESCRIPTION OF THE PREFERRED EMBODIMENTS

A rotating optical disc sways up and down in a perpendicular direction to the information surface (i.e., axial deviation of the disc occurs). The axial deviation occurs in synchronization with the rotation of the disc motor and the speed of the axial deviation is smallest when the information surface reaches the phase in the swaying range which is nearest to the object lens (i.e., the lower axial deviation limit). Since the relative speed of the information surface of the disc to the focal point becomes minimum when the focal point of the light beam is at the minimum velocity position, the focus pull-in is achieved in this phase of the disc. The term lower axial deviation limit is herein alternatively referred to as the minimum velocity position on the information medium axial deviation.

In view of the above, a focus pull-in section in the optical disc apparatus of the present invention first determines whether or not the focal point of the light beam is located in the vicinity of the minimum velocity position on the information medium axial deviation. If it is determined that the focal point of the light beam is located in the vicinity of the minimum velocity position on the information medium axial deviation, the focus pull-in section turns ON a control of a focus servo control section. This position determination is carried out using S-shape signals which appear in a focus servo signal when the focal point of the light beam contacts the information surface of the information medium.

Examples of the present invention will now be described with a special reference to structures and methods used for the position determination by the focus pull-in section.

EXAMPLE 1

Figure 1:
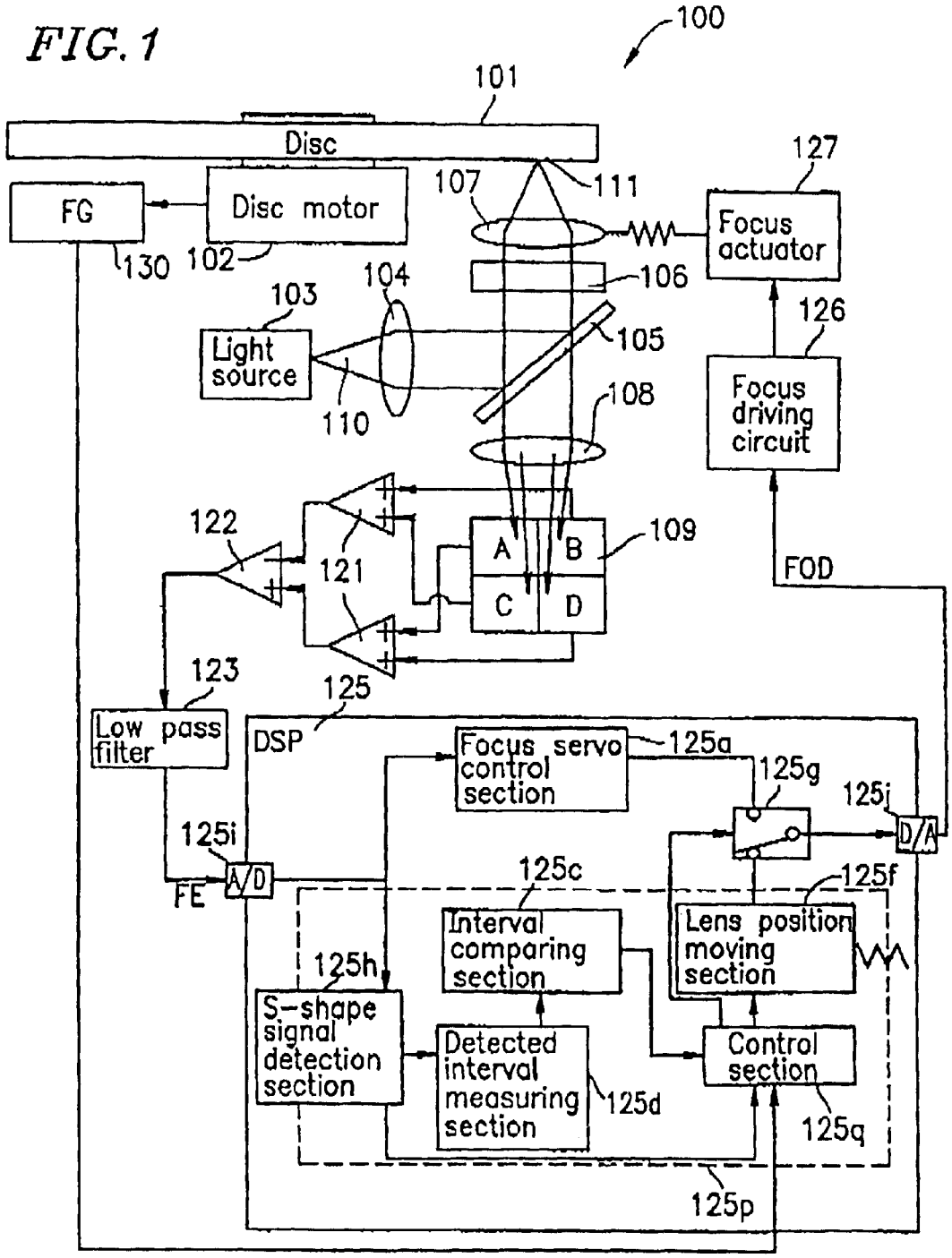
FIG. 1 illustrates a structure of an optical disc device according to Example 1 of the present invention.

FIG. 1 shows a structure of an optical disc apparatus 100 according to Example 1 of the present invention.

The optical disc apparatus 100 includes an optical system for irradiating a light beam on a disc 101 (i.e., an information medium) and forming a light beam spot 111 thereon. The optical system includes a light source 103, e.g., a semiconductor laser, for generating a light beam 110, a coupling lens 104, a polarization beam splitter 105, a polarization hologram element 106, and a converging lens 107. The optical disc apparatus 100 further includes a disc motor 102 for rotating the disc at a predetermined number of revolutions per minute. The rotation speed of the disc 101 can be detected by the frequency generator (FG) 130. The light beam 110 emitted from the light source 103 is converged by the converging lens 107, whereby the light beam spot 111 is formed on the information surface of the disc 101. A focus actuator 127 moves the converging lens 107 in a direction perpendicular to the disc surface, thereby changing the position of the focal point of the light beam. The reflecting light from the light beam spot 111 on the disc 101 passes through the converging lens 107 and then enters a 4-region photodetector 109. Although the 4-region photodetector 109 in the structure in the FIG. 1 detects reflecting light from the disc 101, the 4-region photodetector 109 may alternatively detect transmitted light by appropriately modifying the structure of the apparatus or the arrangement of the sections in the apparatus.

The 4-region photodetector 109 is divided into four regions A to D. The signals detected by the diagonally positioned regions are added together by an adder 121, whereby summation signals are created. Specifically, the signals detected by the regions A and D are added to create a summation signal A+D, and the signals detected by the regions B and C are added to create a summation signal B+C. The summation signal B+C is then subtracted from the summation signal A+D, whereby a differential signal is created. A focus error signal FE is created from the differential signal by using an astigmatic method in which the differential signal is smoothed by a low pass filter (LPF) 123. The focus error signal FE represents the converging state of the light beam and is herein alternatively referred to as a focus servo signal. The focus error signal FE is input to a digital signal processor (DSP) 125 through an A/D converter 125i.

The DSP 125 includes a focus servo control section 125a, a focus pull-in section 125p, and a switch 125g for closing a focus servo. These elements are constituted using a core program (μ code, etc.) stored in the DSP 125. The focus pull-in section 125p includes a control section 125q, an S-shape signal detection section 125h, a detected interval measuring section 125d, an interval comparing section 125c, and a lens position moving section 125f. The DSP 125 also includes the A/D converter 125i for taking in the focus error signal FE and a D/A converter 125j for outputting a focus driving signal FOD.

The focus error signal FE is input to the focus pull-in section 125p and the focus servo control section 125a through the A/D converter 125i. At the beginning of the focus pull-in operation, the switch 125g is coupled to the lens position moving section 125f. The focus pull-in section 125p performs the pull-in operation based on the focus error signal FE (This operation will be described later in more detail).

If the pull-in is successful, switch 125g switches so as to be coupled to the focus servo control section 125a and then the focus servo control section 125a carried out filter calculations such as adding, multiplying, and/or shift processing, thereby creating the focus driving signal FOD, which is then output to a focus driving circuit 126 through the D/A converter 125j. The focus driving circuit 126 amplifies the current of the focus driving signal FOD and drives a focus actuator 127. Accordingly, the focus servo is achieved in a manner where the light beam 110 on the disc 101 brought into a predetermined converging state.

Figure 2:
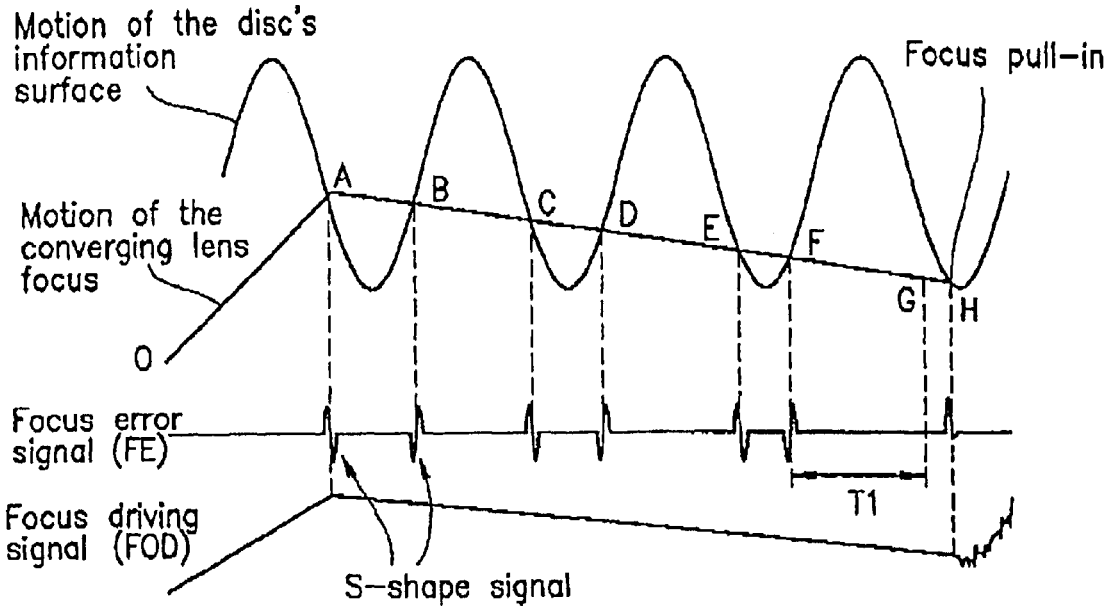
FIG. 2 illustrates the determination of the positional relationship between the focal point of the converging lens and the information surface of the disc according to Example 1.
Figure 3:
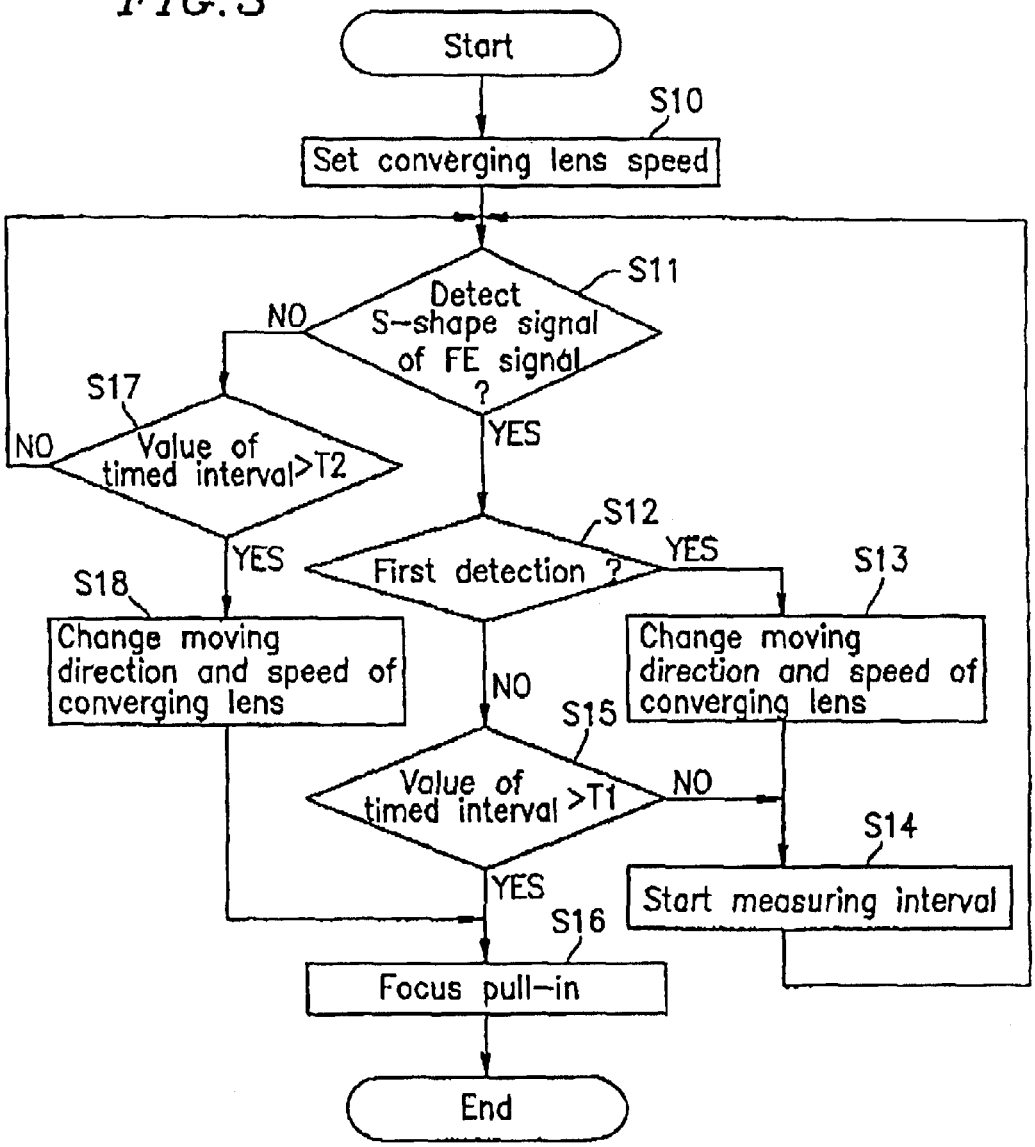
FIG. 3 is a flowchart for the determination process of FIG. 2.

With reference to FIGS. 2 and 3, the focus pull-in operation will now be described in more detail. According to the focus pull-in operation of the present invention, a position determination is first carried out in which whether or not the converging point of the light beam is located in the vicinity of the minimum velocity position on the information medium axial deviation is determined. FIG. 2 illustrates the determination of the positional relationship between the focal point of the converging lens and the information surface of the disc, and FIG. 3 is a flowchart for explaining the determination process of FIG. 2.

In order to prevent a collision of the converging lens 107 with the disc 101, the initial distance between the converging lens 107 and the disc 101 should be set with an appropriate allowance. In this state, the focal point of the light beam is at Point O. The switch 125g is coupled to the lens position moving section 125f, and the output of the lens position moving section 125f is output as the focus driving signal FOD through the D/A converter 125j.

The lens position moving section 125f, which is controlled by the control section 125q, outputs triangle shape waves for maintaining the position of the converging lens 107, or triangular waves for moving the converging lens 107 toward or away from the disc 101 at a predetermined speed.

The focus driving signal FOD, which is output from the lens position moving section 125f through the D/A converter 125j, is used for moving the converging lens 107 toward the information surface of the disc 101. The focus driving signal FOD is set so as to move the converging lens 107 from Point O to Point A in FIG. 2 at a relatively high speed, thereby reducing the time required for the operation (Step S10 in FIG. 3).

S-shape signals appear in the focus servo signal when the converging point of the light beam contacts the information surface of the information medium (e.g., at point A). The S-shape signals are detected by the S-shape signal detection section 125h. When the detected S-shape signal is input to the control section 125q from the S-shape signal detection section 125h, the control section 125q instructs the lens position moving section 125f so as to move the converging lens 107 in a direction away from the information surface of the information medium in a manner where the light beam follows the points B, C, D. . . at a relatively low speed (Steps S11, S12, and S13). The relatively low speed is preferably a speed sufficiently lower than the velocity of the axial deviation of the disc, so that the detection of the S-shape signal is accurately carried out.

The detected interval measuring section 125d measures the time of an interval of temporally adjacent pairs of S-shape signals. The interval comparing section 125c compares the interval detected by the detected interval measuring section 125d and a predetermined first period T1. The first period T1 is preferably set as the time required for substantially one revolution of the disc or slightly shorter. When the interval detected at any moment of the operation exceeds the first period T1 (Point H in FIG. 2), the control section 125q determines that the converging point of the light beam is located in the vicinity of the minimum velocity position on the information medium axial deviation.

Figure 4:
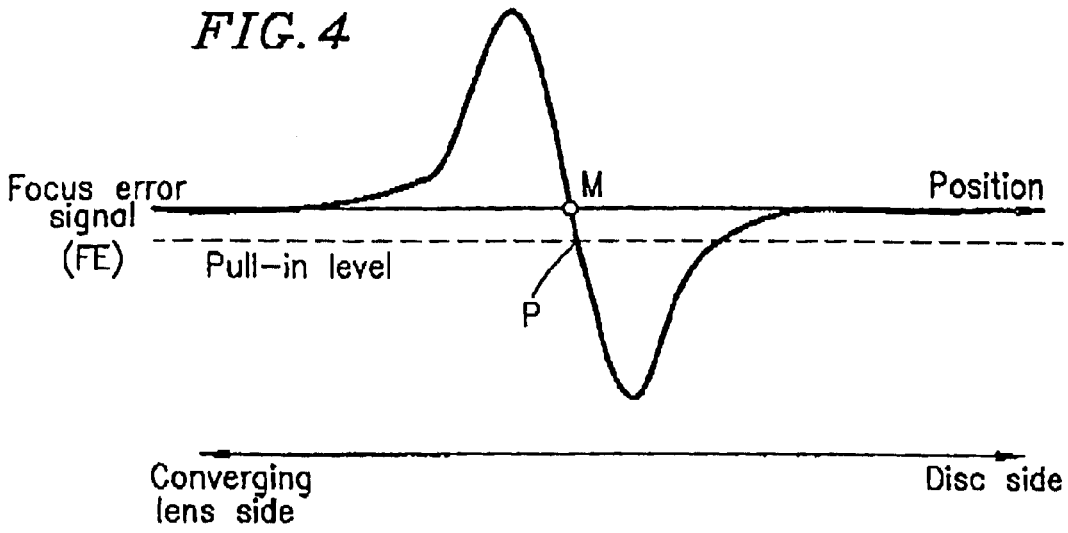
FIG. 4 illustrates a focus pull-in according to Example 1.

Based on this determination result, the control section 125q then determines the level of the focus error signal FE for turning ON the control of the focus servo control section 125a. This operation will now be described with reference to FIG. 4. When it is determined that the converging point of the light beam is located in the vicinity of the minimum velocity position on the information medium axial deviation (i.e., in the vicinity of Point H in FIG. 2), the control section 125q starts moving the converging lens 107 toward the disc 101 by quite small steps. As the converging lens 107 approaches to the disc 101, the focus error signal FE changes as shown in FIG. 4. When the focus error signal FE reaches the focus pull-in level (i.e., Point P in FIG. 4), the control section 125q switches the switch 125g so as to couple the switch 125g to the focus servo control section 125a (i.e., the focus servo is closed). The output of the focus servo control section 125a is output through the D/A converter 125j. In response to this output, the converging point of the light beam is pulled in toward the target control point M. The light beam follows the disc 101 so as to create a predetermined converging state at Point M (Steps S14, S15, S16). The pull-in level can be set in terms of, e.g., the amount of the axial deviation, the number of disc revolution, control level of the focusing or tracking, or the like.

Figure 5:
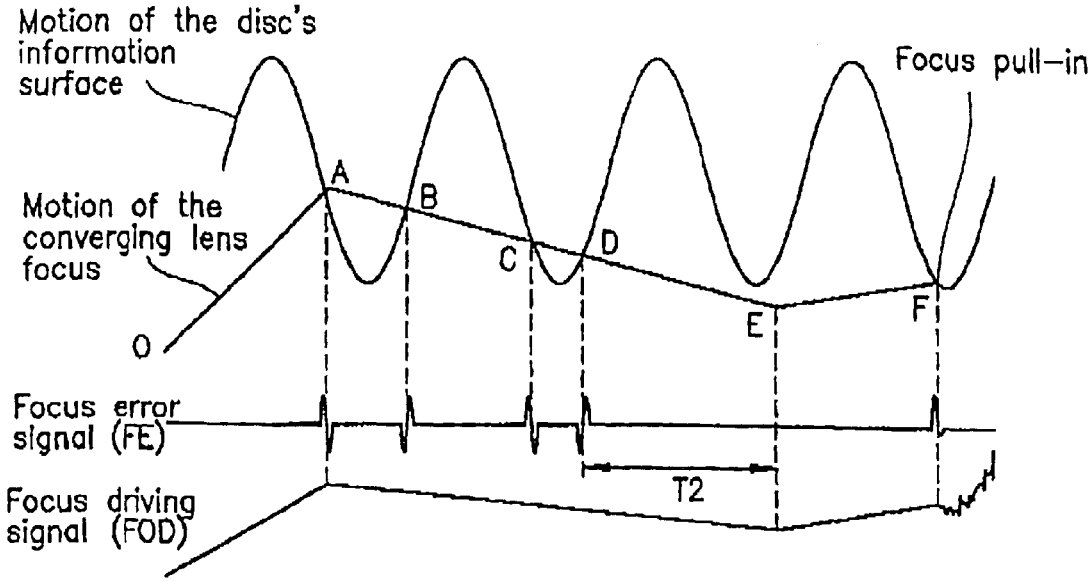
FIG. 5 illustrates the determination of the positional relationship between the focal point of the converging lens and the information surface of the disc according to Example 1.

As shown in FIG. 5, if the output of the detected interval measuring section 125d exceeds the time T2 required for the one revolution of the disc, it is determined that the focal point of the converging lens 107 has already passed by the lower axial deviation limit. Therefore, the control section 125q moves the converging lens 107 toward the information surface of the disc 101 at a still lower speed (in order to stabilize the pull-in, it is preferable to set the speed lower than the speed at which the converging lens 107 was moved away from the disc). The pull-in level is determined with regard to the subsequently detected focus error signal FE and then the switch 125g is switched, thereby the focus pull-in operation is achieved (Steps S17 and S18 in FIG. 3).

Figure 6:
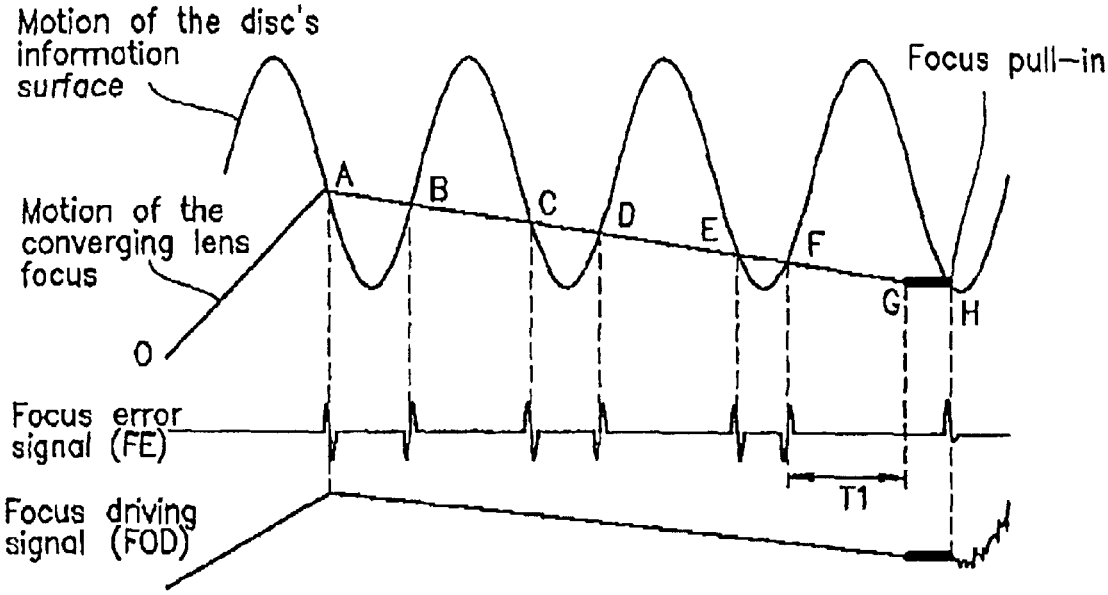
FIG. 6 illustrates the determination of the positional relationship between the focal point of the converging lens and the information surface of the disc according to Example 1.

As shown in FIG. 6, if the next S-shape signal is not detected (i.e., the detected interval measuring section 125d does not generate an output) even after the elapse of the first period T1 after the time when the previous S-shape signal is detected, the control section 125q sends an instruction signal to the lens position moving section 125f so as to stop the motion of the lens position moving section 125f, thereby making the converging point of the light beam wait at Point G, which is located in the vicinity of the lower axial deviation limit. As the disc deviates down toward the converging lens 107, next S-shape signal in the focus error signal FE is detected. With regard to the S-shape signal, the focus pull-in level is determined in the manner described above. Based on the result of the level determination, the control section 125q outputs a signal for switching the switch 125g which is coupled to the lens position moving section 125f, to be coupled to the focus servo control section 125a (Point H in FIG. 6), whereby the output of the focus servo control section 125a is output through the D/A converter 125j. The focus servo is thus achieved. According to this method, the time required for the focus pull-in can be reduced.

Figure 7:
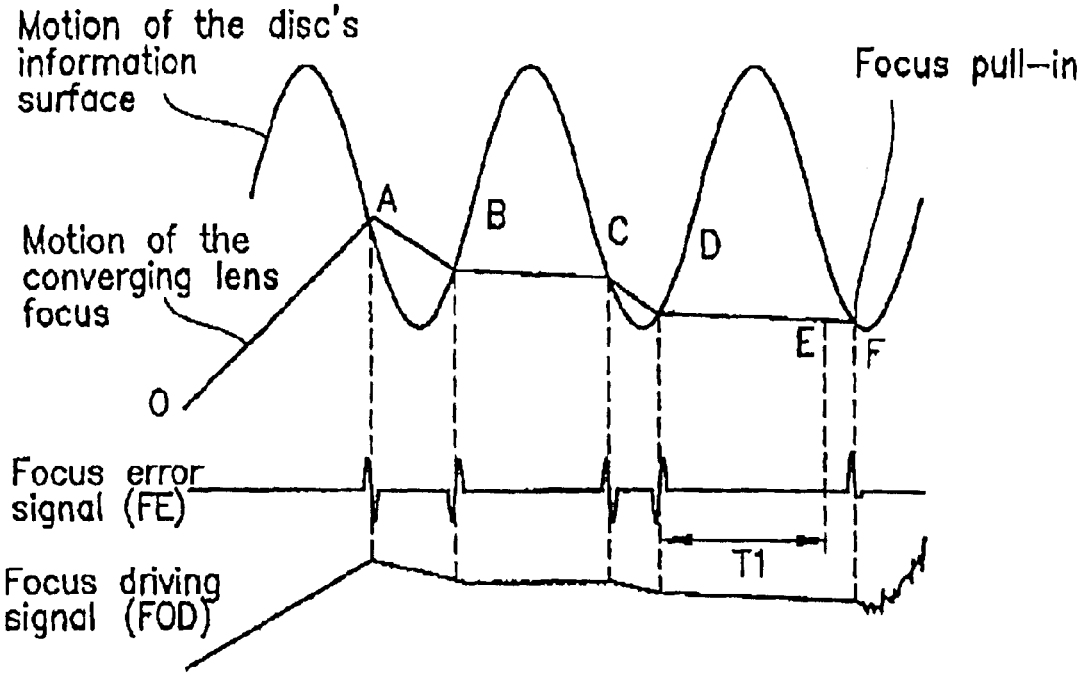
FIG. 7 illustrates the determination of the positional relationship between the focal point of the converging lens and the information surface of the disc according to Example 1.

When the focal point exceeds the upper side of the information surface of the disc 101, the time required for the focus pull-in can be reduced by lowering the converging lens 107 at a relatively high speed, as shown in FIG. 7. In order to determine whether the focal point is located at the upper side of the information surface or the lower side of the information surface, the polarity of S-shape signals in the focus error signal FE is used. This determination process will now be described with reference to FIGS. 8 and 9.

Figure 8:
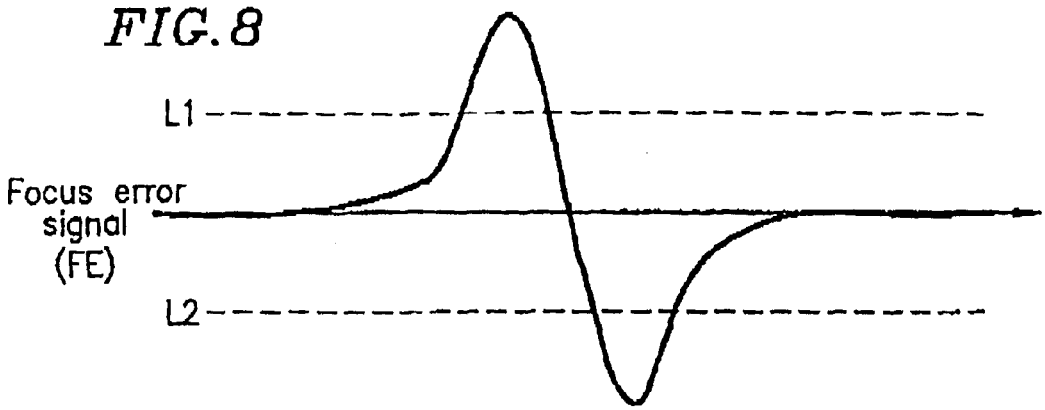
FIG. 8 illustrates the waveforms of S-shape signals in a focus error signal FE.
Figure 9:
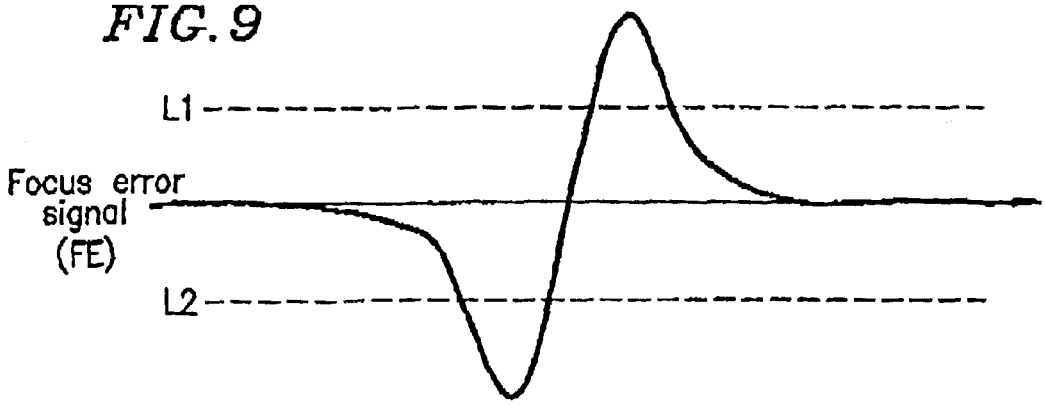
FIG. 9 illustrates the waveforms of S-shape signals in a focus error signal FE.

As shown in FIGS. 8 and 9, S-shape signal detection levels L1 and L2 are set so as to be levels which are approximately 50% of one half of the amplitude of an S-shape signal in the focus error signal FE. The S-shape signal detection section 125h detects that the level of the focus error signal FE reaches L1 and L2, and then outputs to the control section 125q a signal which indicates that the level of the focus error signal FE is beyond the levels L1 and L2. When the polarity of the focus error signal FE changes in L1–L2 order, the control section 125q moves the converging lens 107 away from the information surface of the disc 101 at a relatively high speed. When the polarity of the focus error signal FE changes in L2–L1 order, the control section 125q moves the converging lens 107 away from the information surface of the disc 101 at a relatively low speed. The operation described above provides the motion of the converging lens 107 as described in FIG. 7, thereby reducing the time required for the converging lens 107 to reach the lower axial deviation limit, which is the phase the focus pull-in is possible. Such a section for switching the moving speed of the converging lens 107 in response to the polarity of the S-shape signal may be incorporated into the control section 125q.

Furthermore, by providing a structure in which the output of the frequency generating circuit (FG) 130 inputs to the control section 125q, it is possible to detect the number of the disc revolutions per minute, whereby an automatic setting of the first period T1 and the one rotation time T2, which are used for the comparison with the intervals of the S-shape signals. With such a configuration, it is also possible to switch the moving speed of the converging lens 107 toward/away from the disc 101 in terms of the number of the disc revolution.

As described above, according to Example 1 of the present invention, the pull-in operation is started after detecting that the converging point of the light beam is located in the vicinity of the position where the axial deviation velocity of the disc is substantially minimum. Therefore, even if the rotation speed of the disc is high and the axial deviation speed is significant, it is possible to prevent the disc from colliding to the converging lens 107 and prevent an overcurrent from flowing, thereby achieving a stable focus pull-in.

Although according to the optical disc apparatus 100 in FIG. 1, the disc 101 is positioned horizontally and the converging lens 107 is located under the disc 101, the present invention is not limited by the positional relationship between the disc and the converging lens. For example, the disc can be placed vertically and the converging lens can be moved horizontally. This is also applicable to Examples 2 to 4 described later.

Sections usually included in an optical disc apparatus, such as a tracking control section, a tracking drive circuit, a tracking actuator, etc. are not shown in FIG. 1. Conventional structures can be used for these sections, and thus the explanation thereof is omitted. This is also applicable to Examples 2 to 4 described later.

EXAMPLE 2

Figure 10:
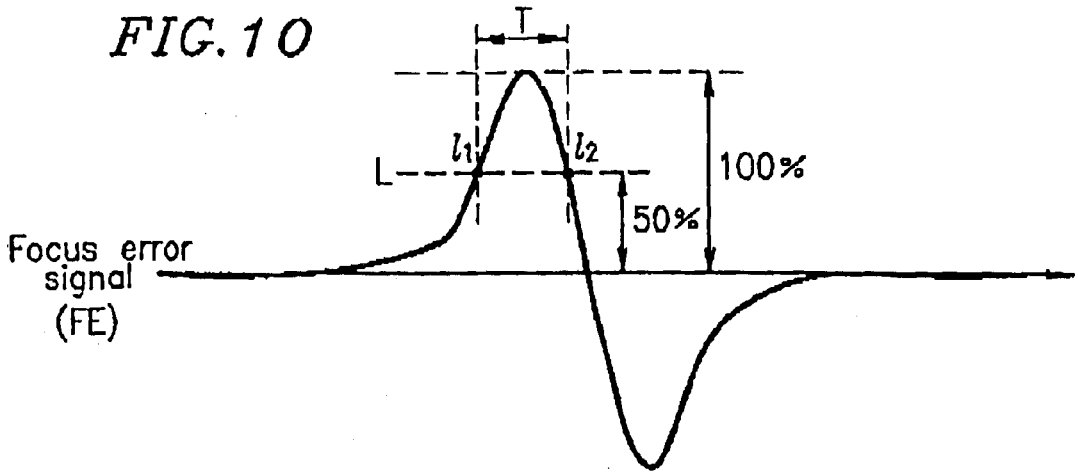
FIG. 10 illustrates the waveforms of S-shape signals in a focus error signal FE.

An optical disc apparatus according to Example 2 of the present invention will now be described. According to Example 2, whether or not the converging point of the light beam is located in the vicinity of the minimum velocity position on the information medium axial deviation is determined by a focus pull-in section by measuring the time width of a predetermined portion of an S-signal in a focus error signal FE. With reference to FIG. 10, the principles for the process will now be described.

FIG. 10 illustrates an S-shape signal in a focus error signal FE. The level L represents the level of the amplitude, which is 50% of half the amplitude of the S-shape signal, and T represents the time interval between the time at which the amplitude reaches the level L and the time at which the amplitude returns the level L. Shorter the interval T, faster the relative speed of the information surface to the converging lens 107, and longer the interval T, slower the relative speed of the information surface to the converging lens 107. A small relative speed means that the converging point of the light beam is located in the vicinity of the minimum velocity position on the information medium axial deviation. According to the present example, by measuring the time width of a predetermined portion of an S-signal in a focus error signal FE (i.e., the portion corresponding to the level L), the relative speed of the information surface to the converging lens 107 is detected. The level L is not limited to 50% of half the amplitude of the S-shape signal. It may be set greater or smaller than 50% of half the amplitude of the S-shape signal.

Figure 11:
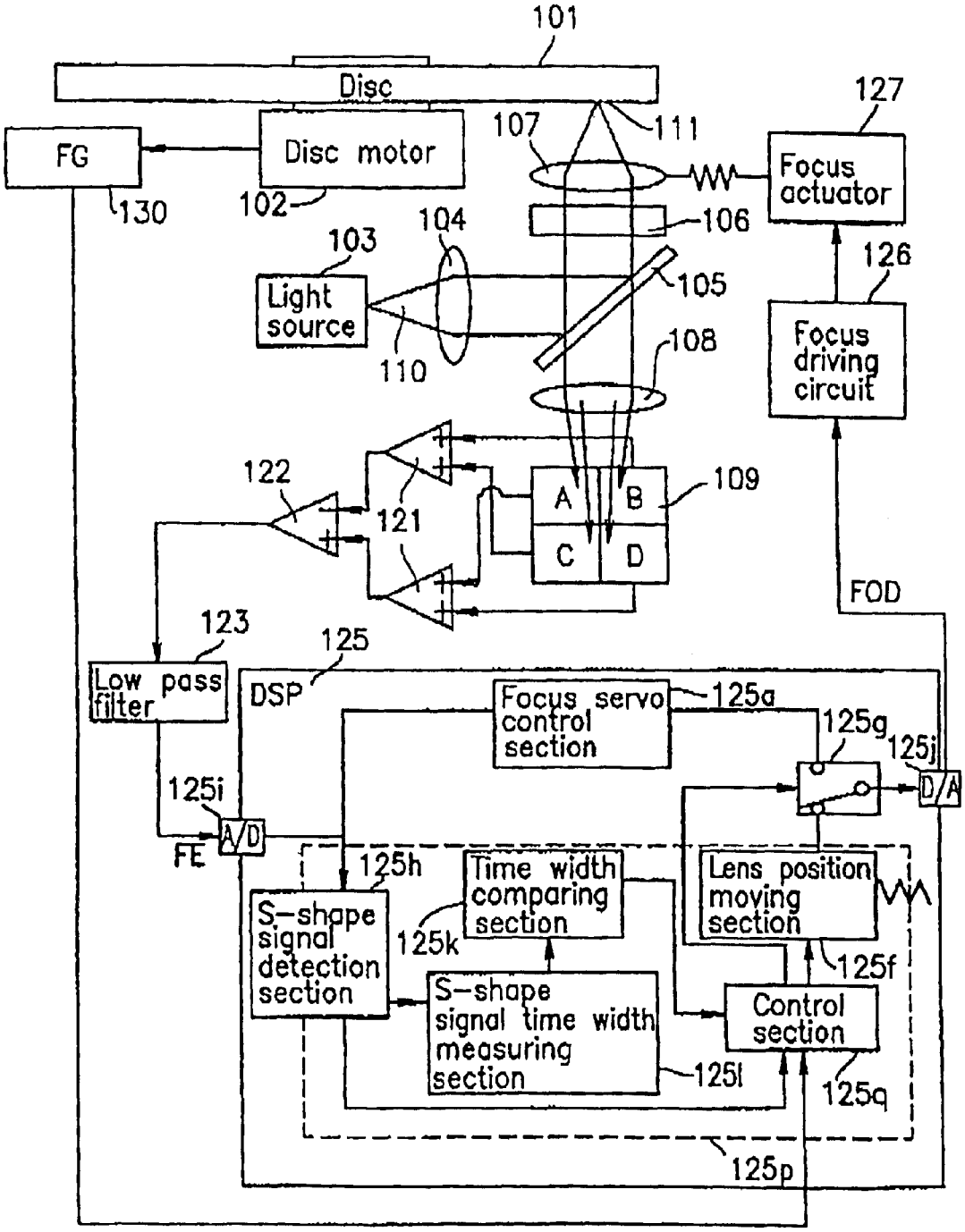
FIG. 11 illustrates a structure of an optical disc device according to Example 2 of the present invention.

FIG. 11 illustrates a structure of an optical disc device according to Example 2 of the present invention. Configurations other than the focus pull-in section 125p are substantially the same as the configurations shown in Example 1 (FIG. 1). The operation of the focus pull-in section in Example 2 will now be described. The explanations for the other sections will be omitted.

As shown in FIG. 11, the focus pull-in section according to the present example includes an S-shape signal time width measuring section (time width measuring section) 125l instead of the detected interval measuring section 125d in Example 1 (FIG. 1). The interval T shown in FIG. 10 is measured by the S-shape signal time width measuring section 125l.

Figure 12:
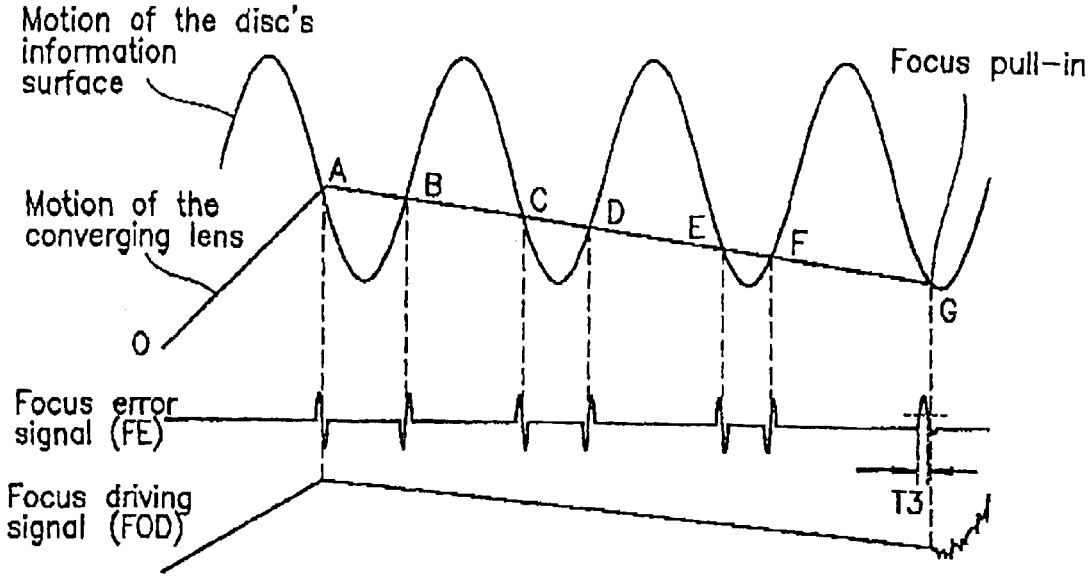
FIG. 12 illustrates the determination of the positional relationship between the focal point of the converging lens and the information surface of the disc according to Example 2.
Figure 13:
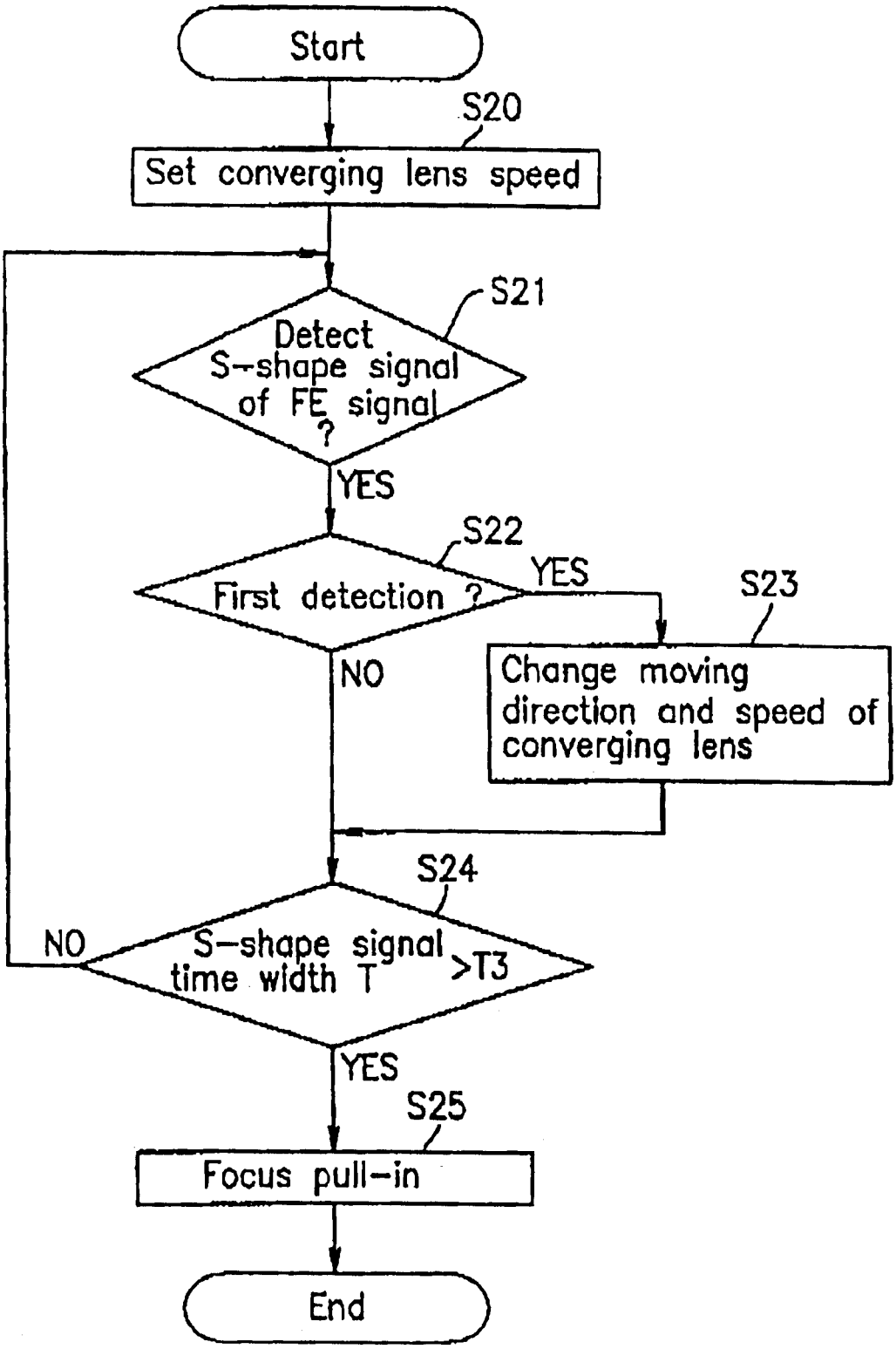
FIG. 13 is a flowchart for the determination process of FIG. 12.

With reference to FIGS. 11, 12 and 13, it will be described how the process for determining whether or not the converging point of the light beam is located in the vicinity of the minimum velocity position on the information medium axial deviation is performed by measuring the time width of a predetermined portion of an S-signal. FIG. 12 illustrates the determination of the positional relationship between the focal point of the converging lens and the information surface of the disc according to the present example, and FIG. 13 is a flowchart for explaining the determination process of FIG. 12.

In order to prevent a collision of the converging lens 107 with the disc 101, the initial distance between the converging lens 107 and the disc 101 should be set with an appropriate allowance. In this state, the focal point of the light beam is at Point O. The switch 125g is coupled to the lens position moving section 125f, and the output of the lens position moving section 125f is output as the focus driving signal FOD through the D/A converter 125j.

The lens position moving section 125f first outputs a focus driving signal FOD through an D/A converter 125j, for moving a converging lens 107 toward an information surface of a disc 101. The focus driving signal FOD is set so as to move the converging lens 107 from Point O to Point A in FIG. 12 at a relatively high speed, thereby reducing the time required for the operation (Step S20 in FIG. 13).

At Point A in FIG. 12, an output signal of the S-shape signal time width measuring section 125l is input to the control section 125q from the S-shape signal time width measuring section 125l. The control section 125q then instructs the lens position moving section 125f so as to move the converging lens 107 in a direction away from the information surface of the information medium in a manner where the light beam follows the points B, C, D. . . at a relatively small speed (Steps S21, S22, and S23). The relatively small speed is preferably a speed sufficiently lower than the axial deviation velocity of the disc, so that the detection of the S-shape signal is accurately carried out.

A time width comparing section 125k compares the time width measured by the S-shape signal time width measuring section 125l and a predetermined second period T3. The second period T3 can be obtained from the optical distance between two S-shape signals and the moving speed of the beam at that moment (the relative speed determined by the pull-in speed and the disc rotation speed). For example, when the optical distance between 11 and 12 shown in FIG. 10 is 10 μm and the moving speed is 10 mm/s, T3≧1 ms. The control section 125q determines that the interval detected at any moment of the operation exceeds the second period T3 (Point G in FIG. 12). Based on this determination result, the control section 125q then determines whether or not the level of the focus error signal FE reaches a predetermined pull-in level (see FIG. 4). If it does, the control section 125q outputs a switching signal to the switch 125g, so as to couple the switch 125g to the focus servo control section 125a. The output of the focus servo control section 125a is output through the D/A converter 125j, whereby the focus servo is achieved (Steps S24 and S25).

Figure 14:
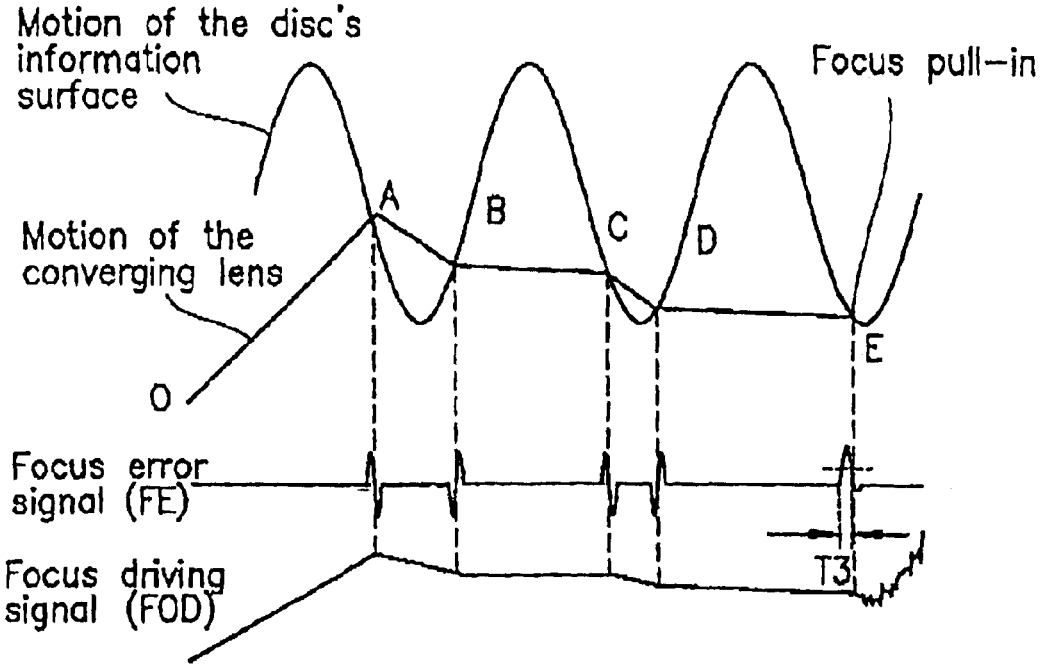
FIG. 14 illustrates the determination of the positional relationship between the focal point of the converging lens and the information surface of the disc according to Example 2.

When the focal point is beyond the upper side of the information surface of the disc 101, the time required for the focus pull-in can be reduced by lowering the converging lens 107 at a relatively high speed, as shown in FIG. 14. In order to determine whether the focal point is located at the upper side of the information surface or the lower side of the information surface, the polarity of S-shape signals in the focus error signal FE is used. As shown in FIGS. 8 and 9, S-shape signal detection levels L1 and L2 are set in a similar manner used in Example 1, so that the levels L1 and L2 are approximately 50% of half the amplitude of an S-shape signal in the focus error signal FE. The S-shape signal detection section 125h detects that the level of the focus error signal FE reaches L1 and L2, and outputs the information to the control section 125q. When the polarity of the focus error signal changes in L1–L2 order, the control section 125q moves the converging lens 107 away from the information surface of the disc 101 at a relatively high speed. When the polarity of the focus error signal changes in L2–L1 order, the control section 125q moves the converging lens 107 away from the information surface of the disc 101 at a relatively low speed. The operation described above provides the motion of the converging lens 107 as described in FIG. 14, thereby reducing the time required for the converging lens 107 to reach the lower axial deviation limit, which is the phase in which the focus pull-in is possible.

As in Example 1, by providing a structure in which the output of the frequency generating circuit (FG) 130 is input to the control section 125q, it is possible to detect the number of the disc revolutions per minute, whereby an automatic setting of the second period T3, which is used for the comparison with the intervals of the S-shape signals is enabled. With such a configuration, it is also possible to switch the moving speed of the converging lens 107 toward/away from the disc 101 in terms of "the number of the disc revolutions per minutes.

As described above, according to Example 2 of the present invention, the pull-in operation is started after detecting that the converging point of the light beam is located in the vicinity of the position where the axial deviation velocity of the disc is substantially minimum. Therefore, even if the rotation speed of the disc is high and the axial deviation speed is significant, it is possible to prevent the disc from colliding with the converging lens 107 and prevent an overcurrent from flowing, which are caused by a failure of the pull-in. Therefore, a stable focus pull-in is achieved.

According to the structure in Examples 1 and 2 for determining that the converging point of the light beam is located at the lower axial deviation limit, a focus error signal FE is used and the output intervals of S-signals or the time width of a predetermined portion of an S-signal is measured. However, the present invention is not limited to using a focus error signal FE. Other signals representing the converging state of the light beam are alternatively used. Examples of such signals are a total luminous energy signal AS (i.e., the sum total of 4-region photodetector 109), an RF (radio frequency) signal, and a tracking error signal. In the case where such signals are used for the optical disc apparatus of the present invention instead of an focus error signal FE, the configurations of the 4-region optical detection 109, the adder 121, the subtracter 122, the low pass filter, etc., may be appropriately modified. Furthermore, in the case where an focus error signal used as in Examples 1 and 2, the configurations for generating the focus error signal FE is not limited to the configuration shown in the examples. Other configuration may alternatively used for the generation of the focus error signal FE.

The functions for Example 1 described with regard to FIGS. 5 and 6 may also implemented in Example 2. In that case, the detected interval measuring section 125d and the interval comparing section 125c in FIG. 1 may be connected in parallel with the S-shape signal time width measuring section 125l and the time width comparing section 125k between the S-shape signal detection section 125h and the control section 125q.

According to such a configuration, the focus pull-in operation is performed as described with reference to FIG. 5. Specifically, if the output of the detected interval measuring section 125d exceeds the time T2 required for one revolution of the disc, it is determined that the focal point of the converging lens 107 has already passed by the lower axial deviation limit. Therefore, the control section 125q moves the converging lens 107 toward the information surface of the disc 101 at a still lower speed (In order to stabilize the pull-in, it is preferable to set the speed lower than the speed at which the converging lens 107 was moved away from the disc). The pull-in level is determined with regard to the subsequently detected focus error signal FE and then the switch 125g is switched, thereby the focus pull-in operation is achieved. Furthermore, as described with reference to FIG. 6, if the next S-shape signal is not detected (i.e., the detected interval measuring section 125d does not generate an output) even after the elapse of the first period T1 after the time when the previous S-shape signal is detected, the control section 125q sends an instruction signal to the lens position moving section 125f so as to stop the motion of the lens position moving section 125f, thereby making the converging point of the light beam wait at Point G, which is located in the vicinity of the lower axial deviation limit. As the disc deviates down toward the converging lens 107, next S-shape signal in the focus error signal FE is detected. With regard to the S-shape signal, the focus pull-in level is determined in the manner described above. Based on the result of the level determination, the control section 125q outputs a signal for switching the switch 125g which is coupled to the lens position moving section 125f, to be coupled to the focus servo control section 125a (Point H in FIG. 6), whereby the output of the focus servo control section 125a is output through the D/A converter 125j. The focus servo is thus achieved. According to this method, the time required for the focus pull-in can be reduced.

EXAMPLE 3

An optical disc apparatus according to Example 3 of the present invention will now be described. The optical disc apparatus in Example 3 further includes a disc identification section for identifying the type of the disc loaded in the optical disc apparatus. Other structures of the optical disc apparatus in Example 3 are the same as the optical disc apparatus in Example 1 or Example 2. The features to be identified include packing density and the thickness of the base material.

Figure 15:
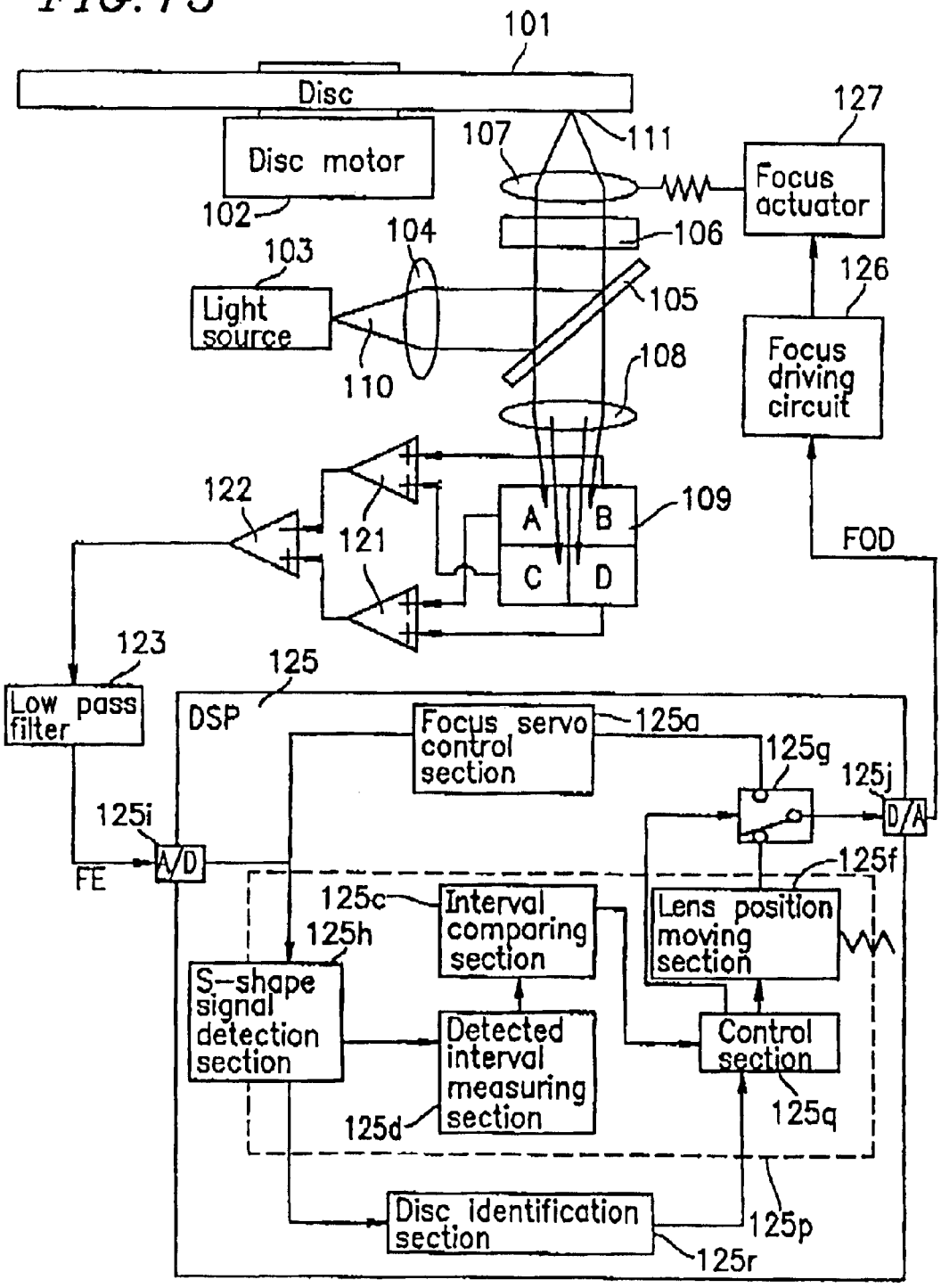
FIG. 15 illustrates a structure of an optical disc device according to Example 3 of the present invention.

FIG. 15 illustrates an optical disc apparatus in Example 1 (FIG. 1) further including such a disc identification section 125r. Other configurations are basically similar to the optical disc apparatus in FIG. 1, and thus the explanation thereof is omitted. The structure and functions of the disc identification section 125r will now be described. Functions of the optical disc apparatus in Example 2 incorporating the disc identification section 125r are basically the same as the optical disc apparatus in FIG. 15, and thus the explanation thereof is omitted.

As shown in FIG. 15, the disc identification section 125r includes in its interior a digital signal processor (DSP) 125. By using, e.g., the amplitude of the output of the S-shape signal detection section 125h, the disc identification section 125r identifies the type of the loaded disc is either CD (low density, 650 MB/disc), SD (medium density, 4.7 GB/disc), or HD (high density, 15 GB/disc). The method for the identification utilizes either a focus error signal FE, an AS (total luminous energy) signal, a TE (tracking error) signal, or an RF signal, or the calculation results of any one or more of these. The present invention is not limited by the identification method.

Between these discs having different density, the thickness of the base material also differs (e.g., CD: d1=1.2 mm, SD: d2=0.6 mm, HD: d3=0.1 mm). The NA (numerical aperture) and the wavelength of the laser use for reproduction/record are changed depending on the type of the disc.

Figure 16A:
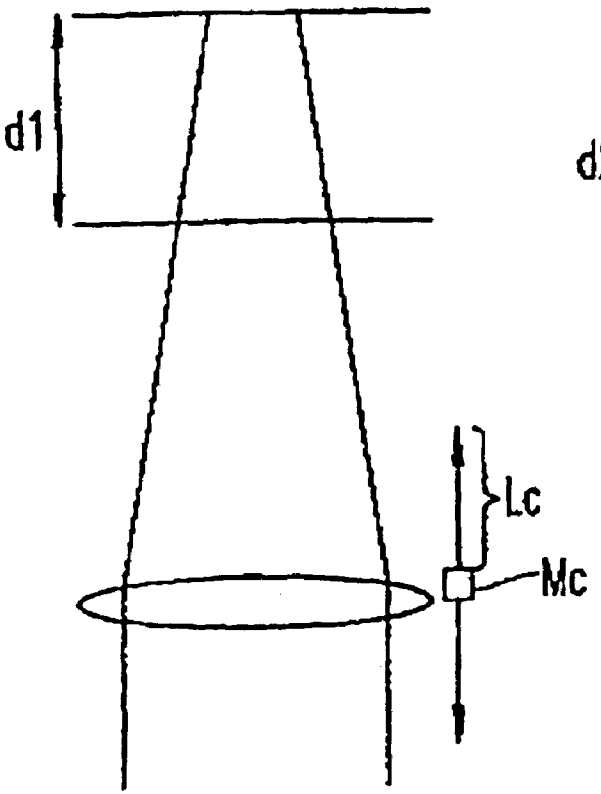
FIG. 16A illustrates the relationship between the thickness of the disc base material and the focal point.
Figure 16B:
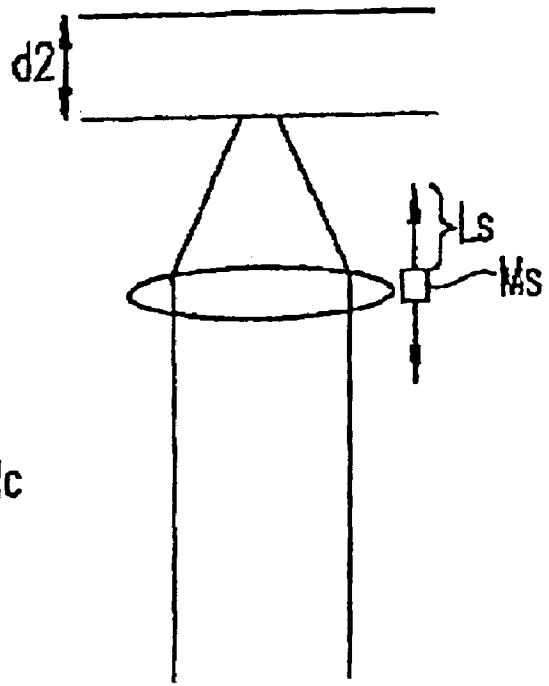
FIG. 16B illustrates the relationship between the thickness of the disc base material and the focal point.
Figure 16C:
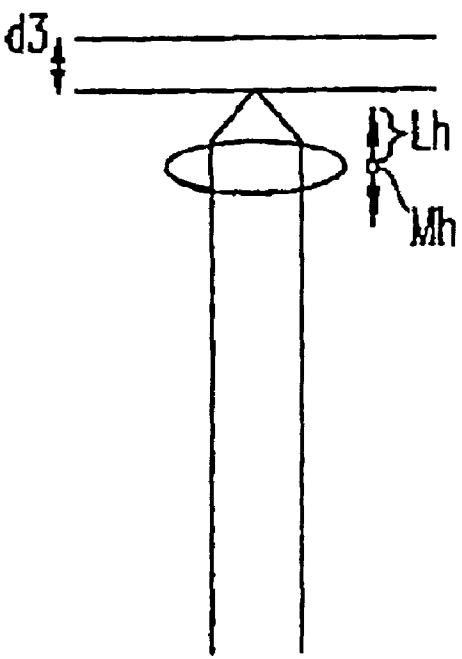
FIG. 16C illustrates the relationship between the thickness of the disc base material and the focal point.

FIGS. 16A to 16C each schematically illustrate the relationship between the thickness of the disc base material and the focal point in a CD, a SD, or an HD. As shown in FIGS. 16A to 16C, the light beam spot or the focal point changes depending on the type of the disc. Along with the change of the focal point, the driving center of the lens (Point M of the S-shape signal in FIG. 4) and the control range of the driving center (the level difference between Point M and the peak value of the S-shape signal) also change. Therefore, when a CD is loaded, for example, the converging lens 107 approaches the disc less than in the case of an HD, and on the contrary, when an HD is loaded, no signal is output if the converging lens stays at the same position as in the case of a CD. The present example of the invention provides the disc identification section capable of identifying the initially loaded disc and based on the identification result, switching the speed of the converging point of the light beam moving toward/away from the disc, the wait position of the converging lens, and the setting of the driving limit, thereby preventing the disc from colliding to the converging lens 107 and prevent an overcurrent from flowing, which are caused by a failure of the pull-in. Therefore, a stable focus pull-in is achieved.

Figure 17:
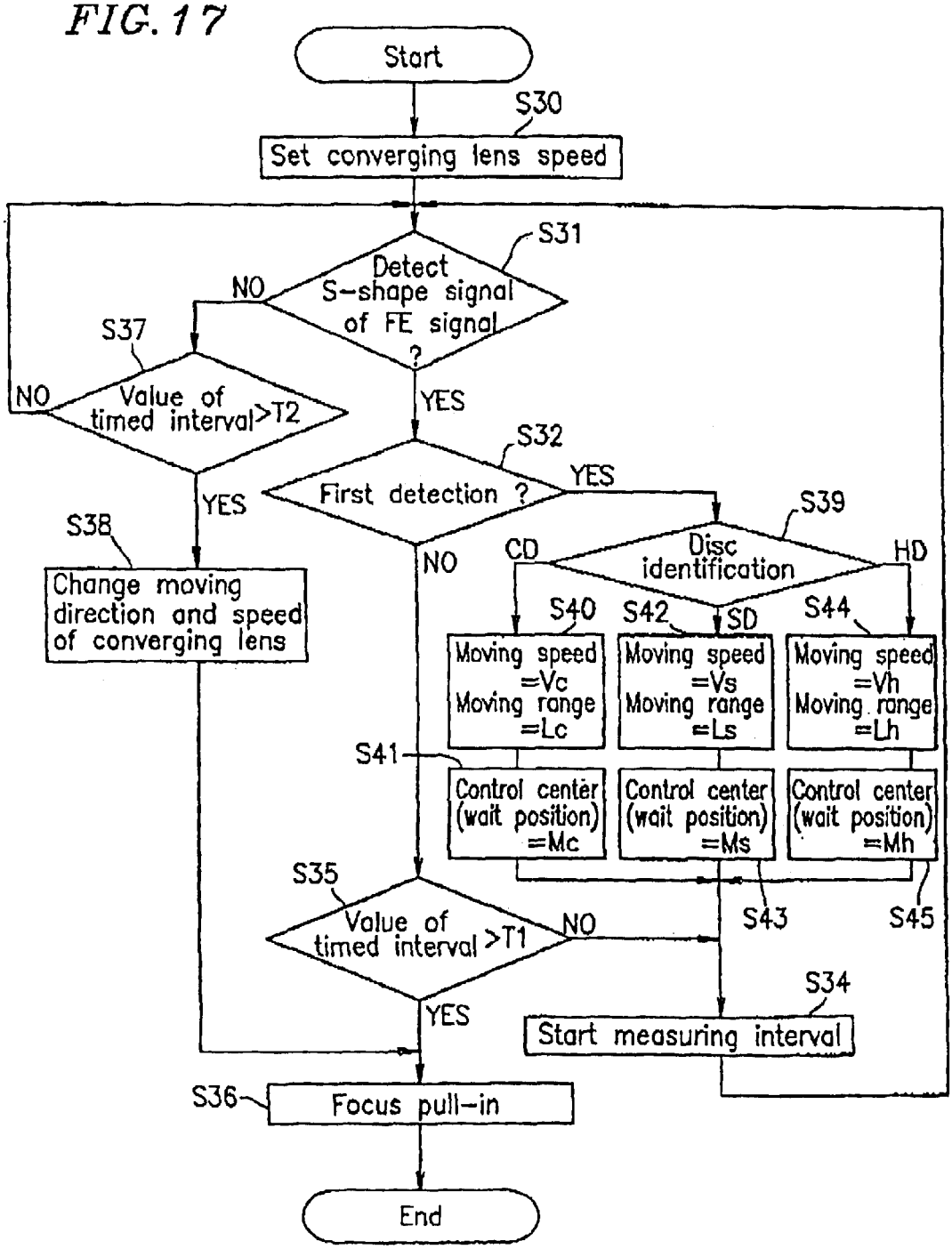
FIG. 17 is a flowchart illustrating the determination of the positional relationship between the focal point of the converging lens and the information surface of the disc according to Example 3.

FIG. 17 is a flowchart illustrating a focus pull-in operation, in which the aforementioned identification of the disc is performed. For example, when the disc identification section 125r determines that a CD is loaded, the control section 125q sets the moving speed at Vc, the drive range at Lc, and the wait position at Mc. When the disc identification section 125r determines that an SD is loaded, the control section 125q sets the moving speed at Vs, the drive range at Ls, and the wait position at Ms. When the disc identification section 125r determines that a HD is loaded, the control section 125q sets the moving speed at Vh, the drive range at Lh, and the wait position at Mh (Steps S40 to S45). The output interval of the S-shape signal is measured based on the set values, and the lower axial deviation limit, which is the position with substantially the minimum velocity of the information medium axial deviation, is detected. As described above, the optical disc apparatus according to the present example further reduces the possibility of a collision between the converging lens and the disc, thereby improving the reliability of the apparatus.

In the case where an optical disc rotates at a low speed (300 to 550 rpm), such as a CD for musical reproduction, a successful pull-in may be possible without detecting the lower axial deviation limit or the moving speed of the converging lens and the axial deviation velocity may become close each other. This may reduce the measurement accuracy of the time width or detected width of the S-shape signal, and may bring about an adverse effect on the pull-in performance. If such is the case, by detecting the number of revolution of the disc 101 by FG signal obtained from the disc motor and estimating the maximum axial deviation velocity, by setting the suitable moving speed of the converging lens 107, or by providing a feature for canceling the lower axial deviation limit detection function, the time required for the pull-in is further reduced.

EXAMPLE 4

An optical disc apparatus according to Example 4 of the present invention will now be described. As described above, Examples 1 to 3 each provide a structure for detecting that the converging point of the light beam is located at the lower axial deviation limit while the focus servo is not closed. However, if the focus servo is off due to an external shock or a scratch on the disc surface, a retry process for performing the focus pull-in again is necessary. According to Example 4, by detecting the lower axial deviation limit while the focus servo is closed, the reliability of such a retry of the pull-in operation is improved.

Figure 18:
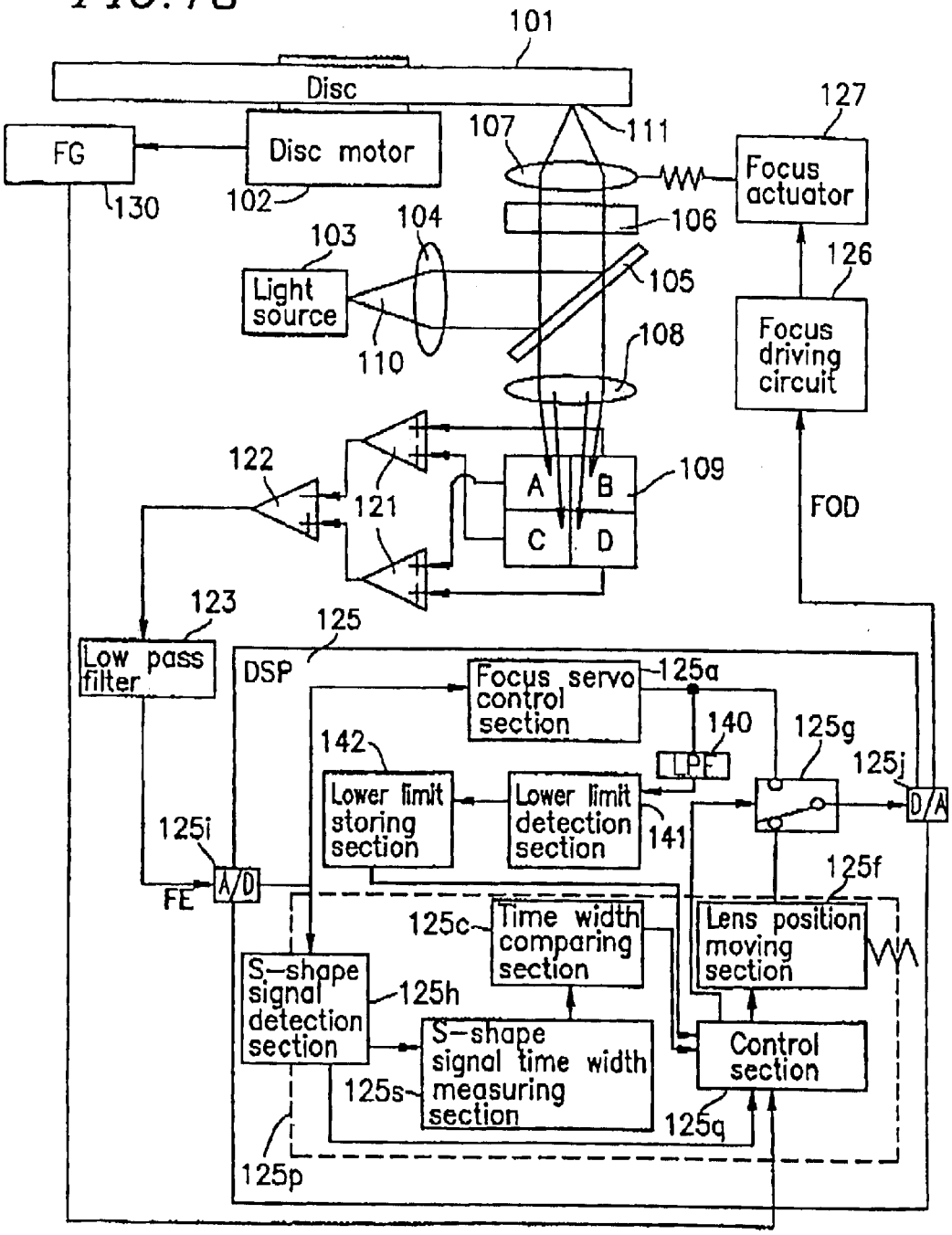
FIG. 18 illustrates a structure of an optical disc device according to Example 4 of the present invention.

An optical disc apparatus according to Example 4 may be provided by incorporating a structure relating to the detection and storing of the lower axial deviation limit into the optical disc apparatus according to Example 2. FIG. 18 illustrates an optical disc apparatus including such a structure relating to the detection and storing of the lower axial deviation limit. Specifically, the optical disc apparatus in FIG. 18 includes a low pass filter (LPF) 140, and a lower limit detection section 141 and a lower limit storing section 142. Sections other than the structure relating to the detection and storing of the lower axial deviation limit are basically same as those in FIG. 11, and thus the explanation thereof is omitted.

The functions of the structure relating to the detection and storing of the lower axial deviation limit will now be described. When the focus servo is closed, the FE input through the A/D converter is subjected to the filter calculation for phase compensation, gain compensation, and the like at the focus servo control section 125a. The FE is then output to the D/A converter 125j through the switch 125g. The output of the D/A converter 125j is input to a focus driving circuit 126 as a focus driving signal FOD, in which the focus driving signal FOD is amplified and input to the focus actuator 127. The focus actuator 127 drives the converging lens 107 in a direction perpendicular to the information surface of the information medium, thereby the converging point of the light beam is controlled so as to always converge correctly with regard to the information surface of the information medium.

The output signal of the focus servo control section 125a, which is generated as a sine wave in response to the axial deviation of the disc, is output to the lower limit detection section 141 through the LPF 140. The lower limit detection section 141 detects, as the lower limit, the minimum point of the output signal of the focus servo control section 125a. This point corresponds to the level in which the disc is at the lowest possible position (i.e., the position closest to the converging lens), and the detected lower limit is stored in the lower limit detection section 142. The stored lower limit is continuously updated in terms of the radius position of the disc 101, the reproduction speed (the number of rotations), and the continuously changing axial deviation.

In order to achieve a similar effect, the lower limit of the signal input to the focus servo control section 125a may be used rather than the signal output from the focus servo control section 125a. In this case, the LPF 140 may be connected to the input terminal of the focus servo control section 125a instead of its output terminal.

Figure 19A:
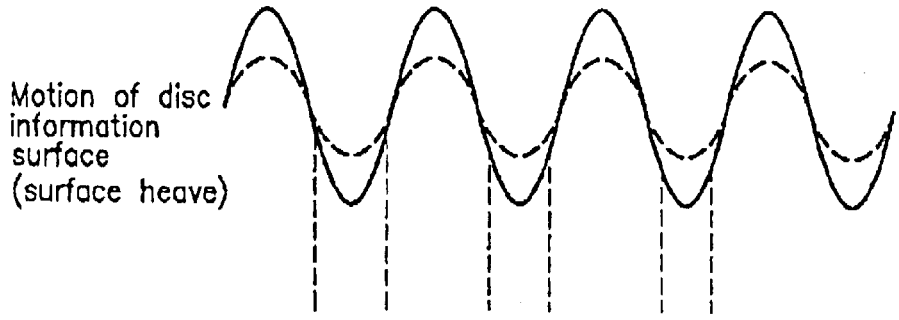
FIG. 19A illustrates the movement of the information surface of the disc due to the axial deviation.
Figure 19B:
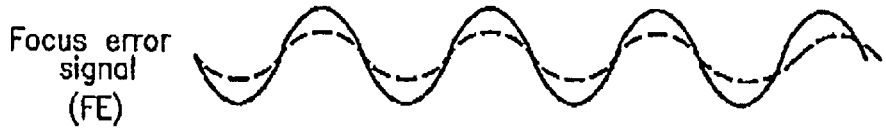
FIG. 19B illustrates the waveform of the focus error signal (FE) generated in response to the movement in FIG. 19A.
Figure 19C:
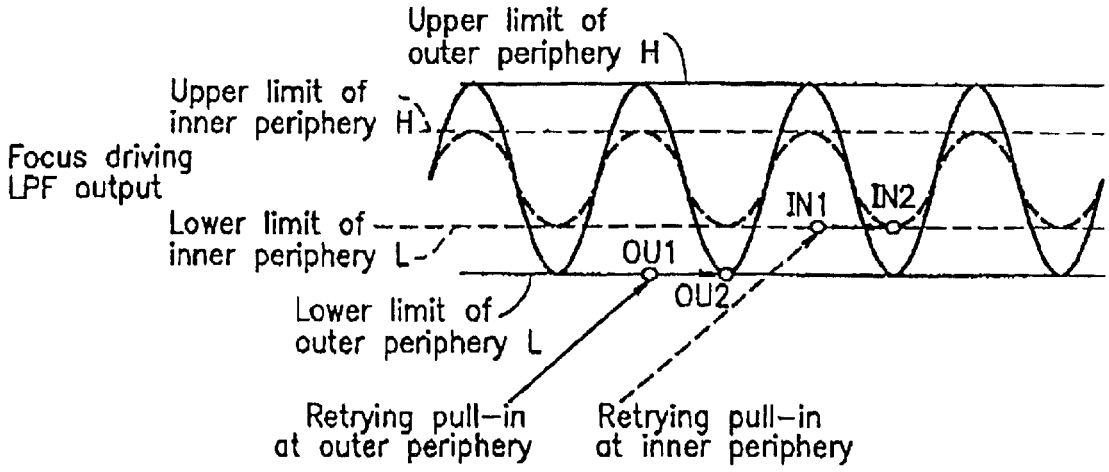
FIG. 19C illustrates the waveform of the output signal of the focus servo control section 125a (LPF output) through a low pass filter.
Figure 20:
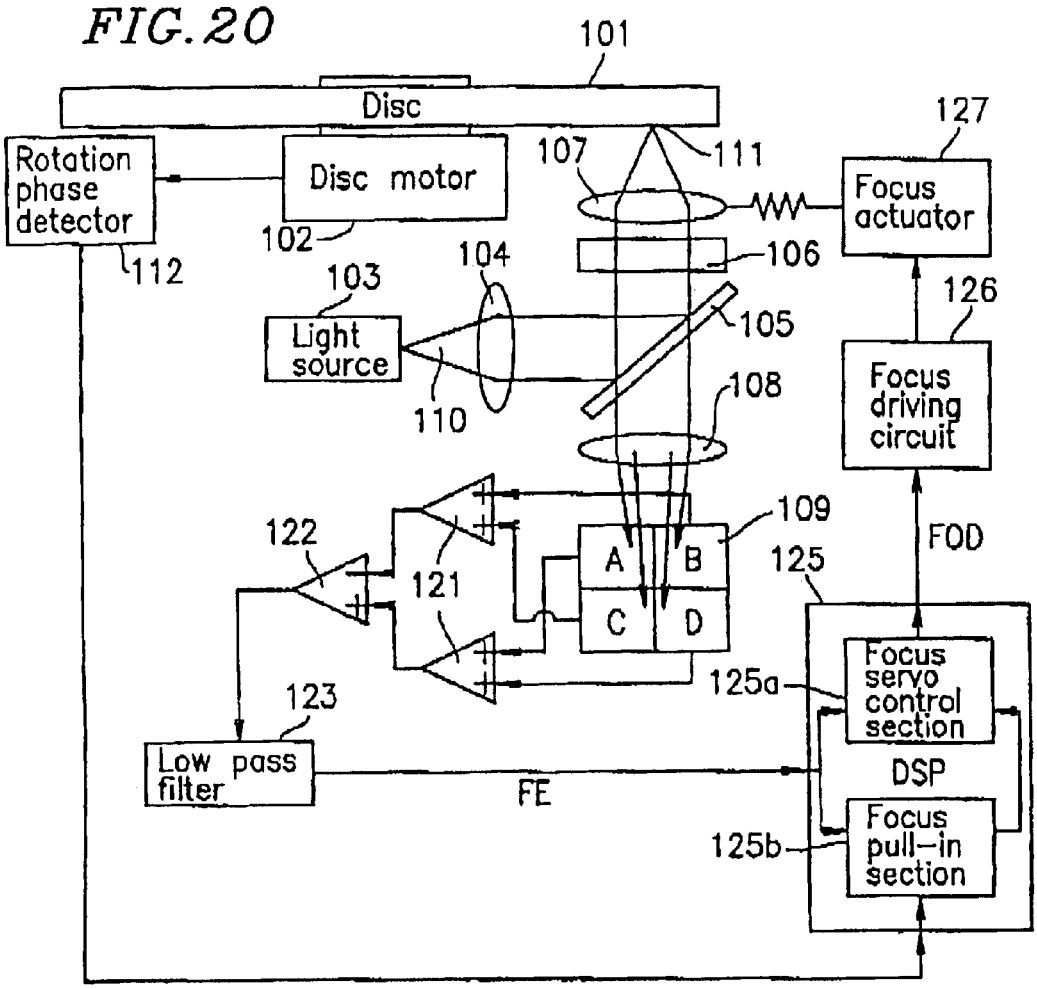
FIG. 20 illustrates a structure of a conventional optical disc device.
Figure 21:
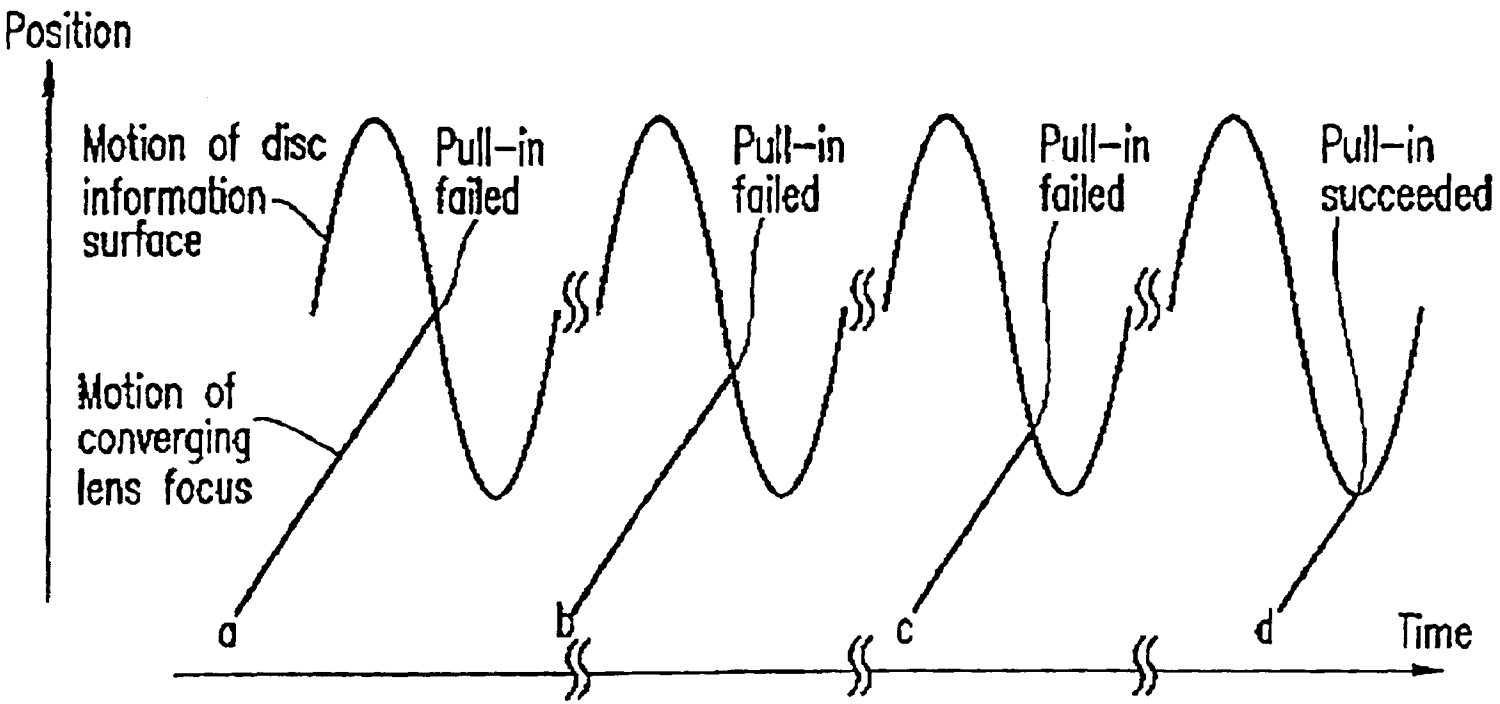
FIG. 21 illustrates the focus pull-in operation according to the conventional optical device.

If focus is out of control due to an external shock or a scratch on the disc surface, a retry of the focus pull-in is carried out by using the level value stored in the lower limit storing section 142. This process will now be described with reference to FIGS. 19A to 19C. FIG. 19A illustrates the movement of the information surface of the disc due to the axial deviation. FIG. 19B illustrates the waveform of the focus error signal (FE) generated in response to the movement in FIG. 19A, FIG. 19C illustrates the waveform of the output signal of the focus servo control section 125a (LPF output) through a low pass filter. In FIGS. 19A to 19C, the solid lines represent the waveforms corresponding to the axial deviation at the outer periphery of the disc, and the dashed lines represent the waveforms corresponding to the axial deviation at the inner periphery of the disc. The focal point of the light beam is located at the inner periphery when, for example, the operation is started, and thus the lower limit detection section 141 detects the inner periphery lower limit L(IN1) of the LPF output, which is shown by the dashed line in FIG. 19C. The detection method varies, such as peak hold, sampling, and size detection, but the present invention is not limited by the detection method. When the focal point of the light beam moves to the outer periphery of the disc 101 for searching, etc., the axial deviation generally increases, and the outer periphery lower limit L(OU1) is detected and stored. Similarly, when the focal point of light beam is located at the in-between location on the disc, the detected level of the lower limit will be the value corresponding to the amplitude of the axial deviation at the in-between location (not shown). Accordingly, the stored level is continuously updated in response to the location of the focal point of the light beam.

If the focus is out of control when the light beam is located at the inner periphery of the disc, the retry of the pull-in is performed by moving the focal point of the light beam toward the information surface of the disc as shown by the dashed arrow in FIG. 19C. When the LPF output reaches the stored lower limit L(IN1), the output is kept unchanged and the focal point of the light beam waits at the corresponding location IN1. Then the disc 101 moves toward the focal point of the light beam, and at the location IN2, an S-shape signals shown in FIG. 4 appears in the focus error signal FE. A predetermined pull-in level corresponding to the S-shape signal is then detected, thereby the focus loop is closed. Similarly, if the focus is out of control when the light beam is located at the outer periphery of the disc, the retry of the pull-in is performed by moving the focal point of the light beam toward the information surface of the disc as shown by the dashed arrow in FIG. 19C. When the LPF output reaches the stored lower limit L(OU1), the output is kept unchanged and the focal point of the light beam waits at the corresponding location OU1. Then the disc 101 moves toward the focal point of the light beam, and at the location OU2, an S-shape signal such as that shown in FIG. 4 appears in the focus error signal FE. A predetermined pull-in level corresponding to the S-shape signal is then detected, thereby the focus loop is closed.

Unlike in Example 2, according to Example 4 of the present invention, it is not necessary to gradually move the converging lens 107 toward the disc for detecting the lower axial deviation limit, whereby the faster focus pull-in is achieved. Therefore, the optical disc apparatus of Example 4 is very effective in the case where the retry of pull-in is performed within a limited process time.

In the structure described above, the lower limit stored in the lower limit storing section 142 is continuously updated during a reproduction or a waiting. Alternatively, the optical disc apparatus according to the present example may be configured to detect and store, at the start of the operation, more than one lower limit corresponding to more than one location located in a radius direction of the information medium. For example, the lower limits at the inner and outer peripheries, or more than one lower limit at any other of a plurality of locations, can be stored. Based on the more than one lower limit stored in the lower limit storing section 142, the suitable lower limits corresponding to desired locations in a radius direction of the information medium, can be obtained by calculations such as linear complement or functional approximation. A calculation section for performing such a calculation may be provided in the lower limit storing section 142. Similar effects can be achieved by using the lower limit corresponding to any locations on the information medium for determining the wait level of pull-in (i.e., the waiting location) at the location where the focus went out of control.

Furthermore, by incorporating the structure relating to the detection and storing of the lower axial deviation limit into the configuration described in Example 1 or 3, more reliable optical disc apparatus is provided.

As described above, the focus pull-in section according to the optical disc apparatus of the present invention first determines whether or not the focal point of the light beam is located in the vicinity of the minimum velocity position on the information medium axial deviation. If it is determined that the focal point of the light beam is located in the vicinity of the minimum velocity position on the information medium axial deviation, the focus pull-in section turns ON the control of the focus servo control section. Therefore, even if the rotation speed of the disc is high and the axial deviation speed is significant, it is possible to achieve a stable focus pull-in and following in a reduced time.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disc apparatus comprising:

a converging section for converging a light beam and irradiating a rotating information medium with the converged light beam;

a moving section for moving the converging section, thereby moving a converging point of the converged light beam in a direction perpendicular to an information surface of the information medium;

a converging state detection section for generating a focus servo signal which represents a converging state of the light beam on the information medium based on reflected light or transmitted light of the light beam from the information medium;

a focus servo control section for controlling the moving section based on the focus servo signal, so that the light beam reaches a predetermined converging state on the information medium; and a focus pull-in section for turning ON [the control by] the focus servo control section*; and*

*an interval measuring section for measuring an interval between temporally adjoining two of the focus servo signals appearing in sequence*, wherein the focus pull-in section turns ON [the control by] the focus servo control section [in a case where the focus pull-in section determines that the converging point of the light beam is located in the vicinity of the minimum velocity position on the information medium axial deviation] *when detected that the interval between adjoining two of the focus servo signals exceeds a predetermined period of time*.

2. An optical disc apparatus according to claim 1, further comprising an S-shape signal detection section for detecting S-shape signals which appear in the focus servo signal when the converging point of the light beam contacts *with* the information surface of the invention medium, wherein the focus pull-in section determines whether or not the converging point of the light beam is located in [the vicinity of the minimum velocity position on the information medium axial deviation] *the vicinity of the position where the velocity of the information medium axial deviation is minimum*.

3. An optical disc apparatus according to claim 2, further comprising a detected interval measuring section for measuring an interval between temporally adjoining two of the S-shape signals, wherein the focus pull-in section determines that the converging point of the light beam is located in [the vicinity of the minimum velocity position on the information medium axial deviation] *the vicinity of the position where the velocity of the information medium axial deviation is minimum* when the interval exceeds a predetermined first period of time.

4. An optical disc apparatus according to claim 3, wherein the S-shape signal detection section detects the S-shape signals by either moving the converging point of the light beam toward or away from the information surface of the information medium, or making the converging point of the light beam wait at a predetermined position.

5. An optical disc apparatus according to claim 4, wherein the S-shape signal detection section detects the S-shape signals by retrying to move the converging point of the light beam toward the information surface of the information medium at a predetermined speed, in the case where the interval is not output from the detected interval measuring section after the elapse of time required for one revolution of the information medium.

6. An optical disc apparatus according to claim 5, wherein a retry speed of the converging point of the light beam is set so as to be smaller than a speed of the previous motion toward or away from the information surface of the information medium.

7. An optical disc apparatus according to claim 4, wherein the S-shape signals are detected by making the converging point of the light beam wait at a predetermined position in the case where the interval is not output from the detected interval measuring section after the elapse of the first period.

8. An optical disc apparatus according to claim 2, further comprising a time width measuring section for measuring a time width of a predetermined portion of an S-signal, wherein the focus pull-in section determines that the converging point of the light beam is located in [the vicinity of the minimum velocity position on the information medium axial deviation] *the vicinity of the position where the velocity of the information medium axial deviation is minimum* when the interval exceeds a predetermined second period of time.

9. An optical disc apparatus according to claim 8, wherein the S-shape signal detection section detects the S-shape signal by either moving the converging point of the light beam toward or away from the information surfaces of the information medium, or making the converging point of the light beam wait at an predetermined position.

10. An optical disc apparatus according to claim 9, wherein the S-shape signal detection section detects the S-shape signals by retrying to move the converging point of the light beam toward the information surface of the information medium at a predetermined speed, in the case where the interval is not output from the detected interval measuring section after the elapse of time required for one revolution of the information medium.

11. An optical disc apparatus according to claim 10, wherein a retry speed of the converging point of the light beam is set so as to be smaller than a speed of the previous motion toward or away from the information surface of the information medium.

12. An optical disc apparatus according to claim 9, wherein the S-shape signal detection section detects the S-shape signals by making the converging point of the light beam wait at a predetermined position in the case where the interval is not output from the detected interval measuring section after the elapse of the time required for one revolution of the information medium after the time when one of the S-signals was detected, or the elapse of the first period *of time* which is slightly shorter than the time required for one revolution of the information medium.

13. An optical disc apparatus according to claim 1, wherein the focus pull-in section turns ON the control by the focus servo control section when it is detected that the level of the focus servo control section reaches a predetermined pull-in level.

14. An optical disc apparatus according to claim 4, wherein the focus pull-in section further comprises a moving speed switching section for switching the moving speed of the converging point of the light beam in response to the polarity of the S-signals when the focus pull-in section moves the converging point of the light beam toward or away from the information surface of the information medium.

15. An optical disc apparatus according to claim 10, wherein the focus pull-in section further comprises a moving speed switching section for switching the moving speed of the converging point of the light beam in response to the polarity of the S-signals when the focus pull-in section moves the converging point of the light beam toward or away from the information surface of the information medium.

16. An optical disc apparatus according to claim 4, further comprising a rotation speed measurement section for measuring the rotation speed of the information medium, wherein the focus pull-in section sets the first period of time or the predetermined speed based on the rotation speed measured by the rotation speed measurement section.

17. An optical disc apparatus according to claim 9, further comprising a rotation speed measurement section for measuring the rotation speed of the information medium, wherein the focus pull-in section sets the second period of time or the predetermined speed based on the rotation speed measured by the rotation speed measurement section.

18. An optical disc apparatus according to claim 2, further comprising [a] *an* information medium identification section for identifying the type of the information medium by a signal based on reflecting light or transmitting light from the information medium, wherein the focus pull-in section determines a moving speed or a waiting position of the converging point of the light beam when the focus pull-in section moves the converging point of the light beam toward or away from the information surface of the information medium, or makes the converging point of the light beam wait at a predetermined position.

19. An optical disc apparatus according to claim 18, wherein the conversion point of the light beam, moving toward the information surface of the information medium, is kept at a predetermined driving value based on [the detection result of] the type of the information medium, whereby the conversion point of the light beam is kept from approaching unnecessarily close to the information medium.

20. An optical disc apparatus according to claim 1, further comprising a lower limit detection section for detecting the lower limit of an output signal of the focus servo control section or an input signal thereof during the operation of the focus servo control section, and a lower limit storing section for storing the detected lower limit, wherein, [in the case where the focus servo control section is restarted after the focus servo control section is OFF: it is determined that the converging point of the light beam is in the vicinity of the minimum velocity position on the information medium axial deviation when the conversing point of the light beam contacts on the information surface of the information medium until the output signal or the drive signal reaches the lower limit by driving the moving section; and the focus pull-in section performs a retry operation which restarts the control by the focus servo control section when it is determined that the level of the focus servo signal reaches a predetermined pull-in level] *in the case where the focus servo control is OFF: if the converging point of the light beam contacts on the vicinity of the position at where the velocity of the information medium axial deviation is minimum when the output signal of the drive signal reaches the lower limit by moving the conversion point of the light beam toward the information surface of the information medium, the focus pull-in section performs an operation to start the control by the focus servo control section.*

21. An optical disc apparatus according to claim 20, wherein the lower limit storing section stores more than one lower limit which corresponds to more than one location located in the radius direction of the information medium, and the optical disc apparatus further comprises a calculation section for calculating the lower limit corresponding a predetermined location in a radius direction of the information medium based on the at least one lower limit.

22. An optical disc apparatus according to claim 20, wherein the lower limit detection section operates during the operation of the focus servo control section, whereby the stored value of the lower limit storing section is continuously updated.

*23. A digital signal processor for controlling the focus servo of an optical disk apparatus,*

*the optical disk apparatus including;*

*a converging section for converging a light beam and irradiating a rotating information medium with the converged light beam;*

*a moving section for converging a light beam and irradiating a rotating information medium with the converged light beam; and*

*a converging state detection section for generating a focus servo signal which represents a converging state of the light beam on the information medium based on reflected light or transmitted light of the light beam from the information medium,*

*the digital signal processor having an input coupled to the focus servo signal comprising:*

*a focus servo control section for controlling the converging section based on the focus servo signal, so that the light beam reaches a predetermined converging state on the information medium; and*

*an interval measuring section for measuring an interval between temporally adjoining two of the focus servo signals,*

*a focus pull-in section for turning ON the focus servo control section when detected that the interval between adjoining two of the focus servo signals exceeds a predetermined period of time.*

*24. A digital signal processor according to claim 23, further comprising an S-shape signal detection section for detecting S-shape signals which appear in the focus servo signal when the converging point of the light beam contacts the information surface of the information medium,*

*wherein the focus pull-in section determines whether or not the converging point of the light beam is located in the vicinity of the position where the velocity of the information medium axial deviation is minimum.*

*25. A digital signal processor according to claim 24, further comprising a detected interval measuring section for measuring an interval between temporally adjoining two of the S-shape signals,*

*wherein the focus pull-in section determines that the converging point of the light beam is located in the vicinity of the position where the velocity of the information medium axial deviation is minimum when the interval exceeds a predetermined first period of time.*

*26. A digital signal processor according to claim 25, wherein the S-shape signal detection section detects the S-shape signals by either moving the converging point of the light beam toward or away from the information surface of the information medium, or making the converging point of the light beam wait at a predetermined position.*

*27. A digital signal processor according to claim 26, wherein the S-shape signal detection section detects the S-shape signals by retrying to move the converging point of the light beam toward the information surface of the information medium at a predetermined speed, in the case where the interval is not output from the detected interval measuring section after the elapse of time required for one revolution of the information medium.*

*28. A digital signal processor according to claim 27, wherein the focus pull-in section sets the retry speed of the converging point of the light beam so as to be smaller than a speed of the previous motion toward or away from the information surface of the information medium.*

*29. A digital signal processor according to claim 26, wherein the S-shape signals are detected by making the converging point of the light beam wait at a predetermined position in the case where the interval is not output from the detected interval measuring section after the elapse of the first period of time.*

*30. A digital signal processor according to claim 24, further comprising a time width measuring section for measuring a time width of a predetermined portion of an S-signal,*

*wherein the focus pull-in section determines that the converging point of the light beam is located in the vicinity of the position where the velocity of the information medium axial deviation is minimum when the interval exceeds a predetermined second period of time.*

*31. A digital signal processor according to claim 30, wherein the S-shape signal detection section detects the S-shape signal by either moving the converging point of the light beam toward or away from the information surfaces of the information medium, or making the converging point of the light beam wait at an predetermined position.*

*32. A digital signal processor according to claim 31, wherein the S-shape signal detection section detects the S-shape signals by retrying to move the converging point of the light beam toward the information surface of the information medium at a predetermined speed, in the case where the interval is not output from the detected interval measuring section after the elapse of time required for one revolution of the information medium.*

*33. A digital signal processor according to claim 32, wherein the focus pull-in section sets the retry speed of the converging point of the light beam so as to be smaller than a speed of the previous motion toward or away from the information surface of the information medium.*

*34. A digital signal processor according to claim 31, wherein the S-shape signal detection section detects the S-shape signals by making the converging point of the light beam wait at a predetermined position in the case where the interval is not output from the detected interval measuring section after the elapse of the time required for one revolution of the information medium after the time when one of the S-signals was detected, or the elapse of the first period of time which is slightly shorter than the time required for one revolution of the information medium.*

*35. A digital signal processor according to claim 23, wherein the focus pull-in section turns ON the control by the focus servo control section when it is detected that the level of the focus servo control section reaches a predetermined pull-in level.*

*36. A digital signal processor according to claim 26, wherein the focus pull-in section further comprises a moving speed switching section for switching the moving speed of the converging point of the light beam in response to the polarity of the S-signals when the focus pull-in section moves the converging point of the light beam toward or away from the information surface of the information medium.*

*37. A digital signal processor according to claim 32, wherein the focus pull-in section further comprises a moving speed switching section for switching the moving speed of the converging point of the light beam in response to the polarity of the S-signals when the focus pull-in section moves the converging point of the light beam toward or away from the information surface of the information medium.*

*38. A digital signal processor according to claim 26, further comprising a rotation speed measurement section for measuring the rotation speed of the information medium,*

*wherein the focus pull-in section sets the first period of time or the predetermined speed based on the rotation speed measured by the rotation speed measurement section.*

*39. A digital signal processor according to claim 31, further comprising a rotation speed measurement section for measuring the rotation speed of the information medium,*

*wherein the focus pull-in section sets the second period of time or the predetermined speed based on the rotation speed measured by the rotation speed measurement section.*

*40. A digital signal processor according to claim 24, further comprising an information medium identification section for identifying the type of the information medium by a signal based on reflecting light or transmitting light from the information medium,*

*wherein the focus pull-in section determines a moving speed or a waiting position of the converging point of the light beam when the light beam toward or away from the information surface of the information medium, or makes the converging point of the light beam wait at a predetermined position.*

*41. A digital signal processor according to claim 40, wherein the focus pull-in section keeps the conversion point of the light beam, moving toward the information surface of the information medium, at a predetermined driving value based on the type of the information medium, whereby the conversion point of the light beam is kept from approaching unnecessarily close to the information medium.*

*42. A digital signal processor according to claim 23, further comprising a lower limit detection section for detecting the lower limit of an output signal of the focus servo control section or an input signal thereof during the operation of the focus servo control section, and a lower limit storing section for storing the detected lower limit,*

*wherein, in the case where the focus servo control is OFF: if the converging point of the light beam contacts on the vicinity of the position at where the velocity of the information medium axial deviation is minimum when the output signal or the drive signal reaches the lower limit by moving the conversion point of the light beam toward the information surface of the information medium, the focus pull-in section performs an operation to start the control by the focus servo control section.*

*43. A digital signal processor according to claim 42, wherein the lower limit which corresponds to more than one location located in the radius direction of the information medium, and the digital signal processor further comprises a calculation section for calculating the lower limit corresponding to a predetermined location in a radius direction of the information medium based on the at least one lower limit.*

*44. A digital signal processor according to claim 42, wherein the lower limit detection section operates during the operation of the focus servo control section, whereby the stored value of the lower limit storing section is continuously updated.*

* * * * *